United States Patent
Kaburagi et al.

(10) Patent No.: US 6,732,417 B2
(45) Date of Patent: May 11, 2004

(54) DISMANTLING SYSTEM FOR PRODUCT AND ITS METHOD

(75) Inventors: Akira Kaburagi, Saitama (JP); Fumihiro Yamaguchi, Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 230 days.

(21) Appl. No.: 09/958,992

(22) PCT Filed: Mar. 15, 2001

(86) PCT No.: PCT/JP01/02051
§ 371 (c)(1),
(2), (4) Date: Oct. 17, 2001

(87) PCT Pub. No.: WO02/19189
PCT Pub. Date: Mar. 7, 2002

(65) Prior Publication Data
US 2002/0148090 A1 Oct. 17, 2002

(30) Foreign Application Priority Data
Aug. 28, 2000 (JP) .................................... 2000-256668

(51) Int. Cl.$^7$ .............................................. B23Q 17/00
(52) U.S. Cl. ................... 29/407.01; 29/426.3; 29/703; 29/714
(58) Field of Search ............................ 29/403.1, 403.3, 29/426.1, 426.3, 407.01, 407.05, 703, 712, 714; 705/1, 29

(56) References Cited

U.S. PATENT DOCUMENTS

| | | | | |
|---|---|---|---|---|
| 4,037,302 A | * | 7/1977 | Hollander | 29/403.3 |
| 4,905,363 A | * | 3/1990 | Boyenval | 29/403.1 |
| 5,375,062 A | * | 12/1994 | Aoki | 705/29 |
| 5,377,399 A | * | 1/1995 | Ogawa | 29/426.3 |
| 5,699,525 A | * | 12/1997 | Embutsu et al. | 705/7 |
| 5,960,402 A | * | 9/1999 | Embutsu et al. | 705/1 |
| 5,965,858 A | * | 10/1999 | Suzuki et al. | 705/29 |
| 6,594,877 B2 | * | 7/2003 | Mori et al. | 29/403.1 |
| 2001/0047578 A1 | * | 12/2001 | Maruyama et al. | 29/426.1 |
| 2002/0049609 A1 | * | 4/2002 | Susa et al. | 705/1 |
| 2002/0069137 A1 | * | 6/2002 | Hiroshige et al. | 705/27 |
| 2003/0069745 A1 | * | 4/2003 | Zenko | 705/1 |

FOREIGN PATENT DOCUMENTS

| | | |
|---|---|---|
| JP | 11-165160 A | 6/1999 |
| JP | 11-244836 | 9/1999 |
| JP | 2000-126749 | 5/2000 |

OTHER PUBLICATIONS

International Search Report PCT/JP01/02051.
Patent Abstracts of Japan 2000–126749, May 9, 2000.
Patent Abstracts of Japan 11–244836, Sep. 14, 1999.
Patent Abstracts of Japan 2000–053045, Feb. 22, 2000.
Patent Abstracts of Japan 2000–168647, Jun. 20, 2000.
Patent Abstracts of Japan 2001–014413, Jun. 20, 2000.
Patent Abstracts of Japan 07–334583, Dec. 22, 1995.

* cited by examiner

Primary Examiner—David P. Bryant
(74) Attorney, Agent, or Firm—Sughrue Mion, PLLC

(57) ABSTRACT

A dismantling system (automobile dismantling system) 1 of a product for dismantling the product having plural kinds has input means (terminal) 30a, 30b, 40a, 40b, - - - for inputting information of the dismantled product; memory means (a memory device of a host computer 2) for storing the information inputted from the input means 30a, 30b, 40a, 40b, - - - ; lot determining means (means constructed within the host computer 2) for classifying the product into the same kind or the approximately same kind on the basis of the stored product information, and determining a product number as a lot when the number of products of the same kind or the approximately same kind reaches a predetermined number; and dismantling means (automobile dismantling means) 61 for dismantling the product; wherein the product is dismantled by the dismantling means 61 every lot.

12 Claims, 14 Drawing Sheets

FIG.5

AUTOMOBILE CONSTRUCTIONAL PARTS INFORMATION FORMAT

| FRAME No. | MAKER | CAR KIND | GRADE | REGISTRATION YEAR AND MONTH | CONSTRUCTION PARTS | RAW MATERIAL OR TYPE | THE NUMBER OF RECYCLE TIMES OR REUSABLE LIMIT | UTILIZATION USE |
|---|---|---|---|---|---|---|---|---|
| 100 | H | a | x | Feb. 1994 | BUMPER | ABS + URETHANE | ONCE | RECYCLE MATERIAL |
| | | | | | INSTRUMENT PANEL | PP | ... | RECYCLE MATERIAL |
| | | | | | ... | ... | ... | ... |
| | | | | | ENGINE | x x x - x x | 7 YEARS OR 70,000 Km | USED PARTS |
| | | | | | TRANSMISSION | x x x - x x x | 7 YEARS OR 70,000 Km | USED PARTS |
| | | | | | ... | ... | ... | ... |
| | | | | | HARNESS | | | DISUSE |
| | | | | | LAMP | | | DISUSE |
| | | | | | ... | ... | ... | ... |
| 200 | H | b | y | Jan. 1990 | BUMPER | PP | TWICE | RECYCLE MATERIAL |
| | | | | | INSTRUMENT PANEL | ABS | ... | RECYCLE MATERIAL |
| | | | | | ... | ... | ... | ... |
| | | | | | ENGINE | x O x - x x | 7 YEARS OR 70,000 Km | USED PARTS |
| | | | | | TRANSMISSION | | 7 YEARS OR 70,000 Km | USED PARTS |
| | | | | | ... | ... | ... | ... |
| | | | | | HARNESS | | | DISUSE |
| | | | | | LAMP | | | DISUSE |
| ... | | | | | | ... | ... | ... |

FIG.6

DISUSED CAR INFORMATION FORMAT

| FRAME No. | TREATING TRADER | DISUSE YEAR AND MONTH | RUNNING DISTANCE | INSUFFICIENT PARTS | LOT No. | STOCKYARD | DISMANTLING FACTORY |
|---|---|---|---|---|---|---|---|
| 100 | DEALER A | Aug. 2000 | 60,000 | NONEXISTENCE | OOO×× | S | K |
| 200 | DEALER A | Jul. 2000 | 100,000 | NONEXISTENCE | OOOO× | S | K |
| 201 | DEALER B | Jul. 2000 | 120,000 | NONEXISTENCE | OOOO× | S | K |
| 300 | DEALER B | Aug. 2000 | 50,000 | NONEXISTENCE | OOOOO | S | K |
| 500 | DEALER B | Aug. 2000 | 80,000 | NONEXISTENCE |  | T |  |
| 600 | DEALER B | Aug. 2000 | 110,000 | NONEXISTENCE |  | T |  |
| ... |  |  |  |  |  |  |  |
| 101 | COLLECTING TRADER X | Aug. 2000 | 50,000 | BUMPER, ENGINE | OOO×× | S | K |
| 800 | COLLECTING TRADER X | Aug. 2000 | 70,000 | ENGINE | O××× | T | M |
| 805 | COLLECTING TRADER X | Aug. 2000 | 90,000 | NONEXISTENCE | O×××× | T | M |
| 300 | COLLECTING TRADER Y | Aug. 2000 | 150,000 | NONEXISTENCE | OOOOO | S | K |
| 701 | COLLECTING TRADER Y | Aug. 2000 | 120,000 | TRANSMISSION |  | S |  |
| 902 | COLLECTING TRADER Y | Aug. 2000 | 90,000 | BUMPER |  | S |  |
| ... |  |  |  |  |  |  |  |

FIG.7

PAST COLLECTING INFORMATION FORMAT

| CAR KIND | GRADE | COLLECTED CAR NUMBER | | | | | | | | | | | | | | | | | | | | | | | | | |
|---|---|---|---|---|---|---|---|---|---|---|---|---|---|---|---|---|---|---|---|---|---|---|---|---|---|---|
| | | YEAR 2000 | | | | | | | YEAR 1999 | | | | | | | | | | | | | | | | | ... |
| | | Jul. | Jun. | May | Apr. | Mar. | Feb. | Jan. | Dec. | Nov. | Oct. | Sep. | Aug. | Jul. | Jun. | May | Apr. | Mar. | Feb. | Jan. | |
| a | x | xx | xx | xx | xx | xx | xx | xx | xx | xx | xx | xx | xx | xx | xx | xx | xx | xx | xx | xx | |
| | y | xx | xx | xx | xx | xx | xx | xx | xx | xx | xx | xx | xx | xx | xx | xx | xx | xx | xx | xx | |
| | ... | | | | | | | | | | | | | | | | | | | | |
| b | x | xx | xx | xx | xx | xx | xx | xx | xx | xx | xx | xx | xx | xx | xx | xx | xx | xx | xx | xx | |
| | y | xx | xx | xx | xx | xx | xx | xx | xx | xx | xx | xx | xx | xx | xx | xx | xx | xx | xx | xx | |
| | ... | | | | | | | | | | | | | | | | | | | | |
| ... | | | | | | | | | | | | | | | | | | | | | | |

FIG.8

STOCKYARD INFORMATION FORMAT

| STOCKYARD | STOCK AREA | STOCK SITUATION ||||||| VACANT AREA |
| | | CAR KIND | GRADE | CAR NUMBER | OCCUPYING AREA | LOT No. | DISMANTLING START SCHEDULE DAY | |
|---|---|---|---|---|---|---|---|---|
| S | x x x | b | y | 15 | x x x | 0000x | x-MONTH, x-DAY | x x x |
| | | c | x | 20 | x x x | 00000 | x-MONTH, x-DAY | |
| | | d | x | 4 | x x x | | | |
| | | e | x | 3 | x x x | | | |
| | | e | y | 2 | x x x | | | |
| | | f | x | 5 | x x x | | | |
| | | ... | | | | | | |
| T | x x x | g | x | 15 | x x x | 00xxx | x-MONTH, x-DAY | x x x |
| | | h | x | 3 | x x x | | | |
| | | | y | 2 | x x x | | | |
| | | | x | 5 | x x x | | | |
| | | ... | | | | | | |
| ... | | | | | | | | |

FIG.9

DISMANTLING FACTORY INFORMATION FORMAT

| DISMANTLING FACTORY | PROCESSING ABILITY | LOT BEING PROCESSED | | DISMANTLING TERMINATION SCHEDULE DAY | PROCESSING SCHEDULE LOT | | DISMANTLING START SCHEDULE DAY |
|---|---|---|---|---|---|---|---|
| | | LOT No. | CAR NUMBER | | LOT No. | CAR NUMBER | |
| K | xx | OOOxx | 10 | x-MONTH, x-DAY | OOOOx | 15 | x-MONTH, x-DAY |
| | | | | | OOOOO | 20 | x-MONTH, x-DAY |
| | | | | | ... | | |
| M | xx | Oxxxx | 20 | x-MONTH, x-DAY | OOxxx | 15 | x-MONTH, x-DAY |
| | | | | | ... | | |
| ... | | | | | | | |

FIG.10

RECYCLE MATERIAL INFORMATION FORMAT

| RECYCLE MATERIAL | DISMANTLING FACTORY OR STOCKYARD | THE NUMBER OF RECYCLE TIMES | AMOUNT |
|---|---|---|---|
| PP | DISMANTLING FACTORY K | VIRGIN MATERIAL | x x x |
| | | ONCE | x x x |
| | | TWICE | x x x |
| | ⋮ | | |
| | STOCKYARD S | VIRGIN MATERIAL | x x x |
| | | ONCE | x x x |
| | | TWICE | x x x |
| | ⋮ | | |
| ABS | DISMANTLING FACTORY K | VIRGIN MATERIAL | x x x |
| | | ONCE | x x x |
| | | TWICE | x x x |
| | ⋮ | | |
| | STOCKYARD S | VIRGIN MATERIAL | x x x |
| | | ONCE | x x x |
| | | TWICE | x x x |
| | ⋮ | | |
| ⋮ | | | |

FIG.11

USED PARTS INFORMATION FORMAT

| USED PARTS | DISMANTLING FACTORY OR STOCKYARD | TYPE | USE YEAR AND MONTH | RUNNING DISTANCE |
|---|---|---|---|---|
| ENGINE | DISMANTLING FACTORY K | x x x – x x | SIX YEARS AND SIX MONTHS | 60,000 |
| | DISMANTLING FACTORY K | x x x – x x | FIVE YEARS AND THREE MONTHS | 50,000 |
| | ⋮ | | | |
| | STOCKYARD S | ○○○ – x x | FIVE YEARS AND TWO MONTHS | 40,000 |
| | STOCKYARD S | ○ x ○ – x x | SIX YEARS AND FIVE MONTHS | 30,000 |
| | ⋮ | | | |
| TRANSMISSION | DISMANTLING FACTORY K | x x – x x x | SIX YEARS AND SIX MONTHS | 60,000 |
| | DISMANTLING FACTORY K | x x – x x x | FIVE YEARS AND THREE MONTHS | 50,000 |
| | ⋮ | | | |
| | STOCKYARD S | ○○ – x x x | FIVE YEARS AND TWO MONTHS | 40,000 |
| | STOCKYARD S | ○○ – ○○○ | SIX YEARS AND FIVE MONTHS | 30,000 |
| | ⋮ | | | |
| ⋮ | | | | |

DISMANTLING SYSTEM FOR PRODUCT AND ITS METHOD

BACKGROUND ART

1. Utilization Field of Industry

The present invention relates to a dismantling system for a product of plural kinds and its method, and particularly relates to the dismantling system and its method for improving dismantling working efficiency.

2. Prior Art

Used products are rapidly increased as products such as automobiles, home electric products, etc. spread. These used products are collected from end users, and are mainly shredded, and are classified into metals and others (resin, rubber, etc.). After the classification, the metals are practically used as raw materials of the products, and the others are reclaimed and burned up, and burned-up ashes are reclaimed. As a result, environmental problems are caused around a reclaimed land and a burning-up factory.

In recent years, recycling of the used products is advanced in consideration of such environmental problems and resource problems. Namely, the used products are dismantled of their respective constructional parts, and thermoplastic constructional parts are utilized as recycle materials for producing regenerative parts. Reusable constructional parts are practically used as used parts. Therefore, the used products are collected and are then dismantled of the respective constructional parts by a dismantling line, and are further classified.

A recycle processing method of each product is prescribed to dismantle and recycle the product. For example, Japanese Laid-Open (Kokai) Patent No. 7-334583 discloses a recycle system of the product for recycling a disused product on the basis of a database in which a recycle rule of each product is set. In this recycle system of the product, a recycle processing method is constructed as a database every constructional part, and a classification procedure and a disassembly work procedure (dismantlement work procedure) of each constructional part, etc. are also set as databases. The disused product is conveyed to each line of a recycle factory, and is disassembled in accordance with this disassembly work procedure, and is further classified and recycled in accordance with the classification procedure.

However, when products having plural product kinds are recycled, the disused products of different kinds are mixed and conveyed to the dismantling line in the conventional product recycle system so that working efficiency of the disassembly (dismantlement) is reduced. Namely, when the product kinds are different from each other, the number of constructional parts, their kinds, and shapes, attaching positions and attaching methods of the respective constructional parts, etc. are different from each other. Therefore, the disassembly work procedure (dismantling work procedure) is different every disused product. For example, when an automobile is dismantled, a shape, a driving system, a passenger number limit of the automobile, etc. are different in accordance with car kinds and grades. Accordingly, the number of constructional parts and their kinds are different, and the individual constructional parts of an engine, etc. are also different. Therefore, when the engine is detached from a car body, the dismantling work procedure is different in accordance with the car kinds and grades since a shape of the engine, an engine storing shape on a car body side, a fixing method of the engine to the car body, etc. are different in accordance with the car kinds, etc. More concretely, a frame for fixing the engine to the car body and a shape and an attaching position of an engine mount device, etc. are different in accordance with the car kinds. Therefore, bolts, etc. used for fixture between the engine and the engine mount device, and between the engine mount device and the frame, etc. are also different from each other. Further, a working order for detaching the engine from the engine mount device, a working order for detaching the engine mount device from the frame, etc. are also different. Accordingly, when the product kinds such as car kinds, etc. are different, a dismantling worker must pass a using tool from one hand to the other in the dismantling work, and change the working order even when the constructional parts of the same kind of the engine, etc. are detached.

Further, constructions on the dismantling line must be changed in accordance with the dismantling work procedure and a dismantled product. As a result, the number of works is increased every time the products of different kinds are dismantled, thereby reducing working efficiency.

Therefore, an object of the present invention is to provide a dismantling system of a product for improving the efficiency of a dismantling work and its method.

DISCLOSURE OF INVENTION

To solve the above problem, the present invention resides in a dismantling system for a product of plural kinds comprising: input means for inputting information of a kind of the product to be dismantled; memory means for storing the information inputted from said input means; lot determining means for classifying said product into the same kind or the approximately same kind on the basis of the stored product information, and determining a lot when the number of the product of the same kind or the approximately same kind reaches a predetermined number; and dismantling means for dismantling said product; wherein said product is dismantled by said dismantling means every said lot.

In accordance with this dismantling system, the predetermined number of a product of the same kind or the approximately same kind among the products of plural kinds is collected as a lot by the lot determining means so that all constructional parts of the product to be continuously dismantled are set to be the same or almost the same kind. Namely, in this dismantling system, the products of the same kind or the approximately same kind are continuously dismantled so that the products are dismantled without changing a dismantling work procedure.

The above dismantling system of the product further comprises a product information database for setting kind information of said product corresponding to identification information of said product; said input means inputs the identification information of said product; and said lot determining means classifies said product into the same kind or the approximately same kind on the basis of said product information database.

In accordance with this dismantling system of the product, the product kind can be specified from the identification information of the product on the basis of the product information database so that the product of plural kinds can be simply classified into a product of the same kind or the approximately same kind.

Further, in the above dismantling system, recycle information of each constructional part of said product is set in accordance with the identification information and/or the kind information of said product in said product information database; and each constructional part dismantled by said dismantling means from said product is classified on the basis of said recycle information.

In accordance with this dismantling system of the product, each constructional part can be simply classified into recycle material parts, used parts or disused parts on the basis of the product information database while the product is dismantled of each constructional part.

The above dismantling system of the product further comprises collecting means for collecting said product; dismantled parts treating means for treating each constructional part dismantled from said product as a recycle material and/or used parts; and insufficient recycle parts managing means for specifying the kind of the product having insufficient recycle material and/or used parts as constructional parts on the basis of said product information database, and instructing the collection of the product of said specified kind when the recycle material and/or the used parts are insufficient in said dismantled parts treating means; wherein the product of the kind instructed by said insufficient recycle parts managing means is preferentially collected by said collecting means.

In accordance with this dismantling system of the product, information with respect to the insufficient recycle material and used parts is collected from the dismantled parts treating means to the insufficient recycle parts managing means. In this dismantling system, the kind of the product having the insufficient recycle material and used parts as constructional parts is specified by the insufficient recycle parts managing means, and information of this specified kind is sent to the collecting means. Further, in this dismantling system, the product of the specified kind is preferentially collected by the collecting means so that the insufficient recycle material and used parts can be rapidly supplied to the dismantled parts treating means.

Otherwise, the above dismantling system of the product further comprises a past collecting information database for setting a past collecting situation of said product in accordance with a product kind; and said lot determining means determines a lot before the number of the product of the same kind or the approximately same kind reaches said predetermined number, when it is expected that the number is likely to reach said predetermined number on the basis of said past collecting information database.

In accordance with this dismantling system, it is possible to estimate a period in which the number of products of the same kind or the approximately same kind reaches the predetermined number by estimating the number of collected products every product kind on the basis of the past collecting information database. Therefore, in this dismantling system, the number of products of the same kind or the approximately same kind reaches the predetermined number during the dismantle operation even when the number of products of the same kind or the approximately same kind is smaller than the predetermined number and the dismantlement is started with this product number as a lot.

To solve the above problem, the present invention also resides in a dismantling method for a product of plural kinds comprising: a lot determining process for classifying said product into the same kind or the approximately same kind on the basis of information of a kind of the product to be dismantled, and determining a lot when the number of products of the same kind or the approximately same kind reaches a predetermined number; and wherein said product is dismantled every said lot.

In accordance with this dismantling method, the predetermined number of a product of the same kind or the approximately same kind among the product of plural kinds is collected as a lot in the lot determining process so that all constructional parts of the product to be continuously dismantled can be set to be the same or almost the same kind. Namely, in this dismantling method, the products can be dismantled without changing a dismantling work procedure by continuously dismantling the product of the same kind or the approximately same kind.

Further, in the above dismantling method of the product, a product information database is arranged for setting kind information of said product corresponding to identification information of said product; and said product is classified into the same kind or the approximately same kind on the basis of said product information database in said lot determining process.

In accordance with the dismantling method of the product, the product kind can be specified from the identification information of the product on the basis of the product information database so that the product of plural kinds can be simply classified into the product of the same kind or the approximately same kind.

Further, in the above dismantling method of the product, recycle information of each constructional part of said product is set in accordance with the identification information and/or the kind information of said product in said product information database, and each constructional part dismantled from said product is classified on the basis of said recycle information.

In accordance with this dismantling method of the product, each constructional part can be simply classified into recycle material parts, used parts or disused parts on the basis of the product information database while the product is dismantled for each constructional part.

The above dismantling method of the product further includes an insufficient recycle parts managing process for specifying a kind of the product having insufficient recycle material and/or used parts as constructional parts on the basis of said product information database, and instructing collection of the product of said specified kind, when the recycle material and/or the used parts are insufficient, and the product of the kind instructed in said insufficient recycle parts managing process is preferentially collected.

In accordance with this dismantling method, the kind of the product having the insufficient recycle material and used parts as constructional parts is specified in the insufficient recycle parts managing process. Further, in this dismantling method, the insufficient recycle material or used parts can be rapidly supplied by preferentially collecting the product of the specified kind.

Otherwise, in the above dismantling method of the product, a past collecting information database is arranged for setting a past collecting situation of said product in accordance with said product kind; and a lot is determined in said lot determining process before the number of the product of the same kind or the approximately same kind reaches said predetermined number, when it is expected that the number is likely to reach said predetermined number on the basis of said past collecting information database.

In accordance with this dismantling method of the product, it is possible to estimate a period in which the number of products of the same kind or the approximately same kind reaches the predetermined number by estimating the number of collected products every product kind on the basis of the past collecting information database. Therefore, in this dismantling method, the number of products of the same kind or the approximately same kind reaches the predetermined number during the dismantling operation even when the number of products of the same kind or the approximately same kind is smaller than the predetermined number and the dismantlement is started with this product number as a lot.

The identification information of the product is information available to discriminate the individual product such as a unique number, a bar code, etc. given to the individual product. For example, the identification information is a car body number (frame number) in the case of an automobile, and is a manufacture number in the case of a home electric product. The kind information of the product is classification information of the product able to specify that the product is a product having the same constructional parts or a product having almost the same constructional parts. For example, this kind information is a maker, a car kind, a grade, etc. in the case of the automobile. Accordingly, the product of the same kind or the approximately same kind has the same constructional parts or almost has the same constructional parts, and is assembled by the same procedure or is almost assembled by the same procedure. Therefore, a dismantling work procedure is the same or is almost the same. The predetermined number is an optimum dismantling number when the products of the same kind or the approximately same kind are continuously dismantled, and is set by a space for stocking the dismantled products, dismantling ability of a dismantling line, etc. The recycle information is information with respect to recycle of each constructional parts of the product. The recycle information is information of the constructional parts able to be used as a recycle material and/or information of reusable constructional parts (able to be used as used parts), etc. For example, the information with respect to the recycle material is whether it is usable or not as the recycle material, a raw material, the number of recycle times, etc. The information with respect to the reusable parts is whether parts are reusable or not, a type of the parts, a reusable limit, etc. Further, the past collecting situation statistically shows a past collecting number of the products collected for dismantlement. For example, the past collecting situation is a monthly collecting number for the past several years, etc.

BRIEF DESCRIPTION OF DRAWINGS

FIG. 5 shows a data format of an automobile constructional parts information database of FIG. 2.

FIG. 6 shows a data format of a disused car information database of FIG. 2.

FIG. 7 shows a data format of a past collecting information database of FIG. 2.

FIG. 8 shows a data format of a stockyard information database of FIG. 2.

FIG. 9 shows a data format of a dismantling factory information database of FIG. 2.

FIG. 10 shows a data format of a recycle material information database of FIG. 2.

FIG. 11 shows a data format of a used parts information database of FIG. 2.

BEST MODE FOR CARRYING OUT THE INVENTION

Embodiment modes of a dismantling system of a product and its method in the present invention will next be explained with reference to the drawings.

In the dismantling system of a product and its method in the present invention, a predetermined number of products of the same kind or the approximately same kind are collected and form a lot. The products are dismantled every lot so that the products can be continuously dismantled by the same dismantling work procedure. Therefore, a product information database for setting product kind information corresponding to product identification information is arranged so that the products of plural kinds are classified into products of the same kind or the approximately same kind. Further, in this dismantling method and its method, recycle information of each constructional part of a product is set in the product information database in accordance with the product identification information and/or product kind information so that each constructional part after the dismantlement can be efficiently classified. Further, it is possible to specify an insufficient recycle material and the kind of a product having used parts. Furthermore, a past collecting information database for setting a past collecting situation of the product in accordance with the product kind is arranged in this dismantling system and its method. Accordingly, a collecting pace of products is estimated in accordance with each product kind, and the entire system can be efficiently practically used by hastening dismantling start.

In this embodiment mode, the dismantling system of a product and its method in the present invention are applied to an automobile. Accordingly, in this embodiment mode, a frame number as a unique number given to each automobile is used as identification information of the product in the present invention, and a car kind and a grade every car kind are used as kind information of the product in the present invention. In this automobile dismantling system, the automobile (disused car) dismantled by a dealer, a collecting trader, etc. is collected, and is temporarily stored to a stockyard. Further, in the automobile dismantling system, after the disused car is dismantled in a dismantling factory every lot, constructional parts of the dismantled automobile are used as a recycle material in a regenerative parts factory, and are practically used as used parts in an automobile repairing factory, a used parts sales trader, etc. The automobile dismantling system has a host computer for generalizing the entire system. Each terminal arranged in the dealer, the collecting trader, the stockyard, the dismantling factory, the regenerative parts factory, the automobile repairing factory, the used parts sales trader, etc. is connected to this host computer. The host computer may be arranged in an automobile maker, and may be also arranged in a special company for generalizing the automobile dismantling system.

Figure 1:
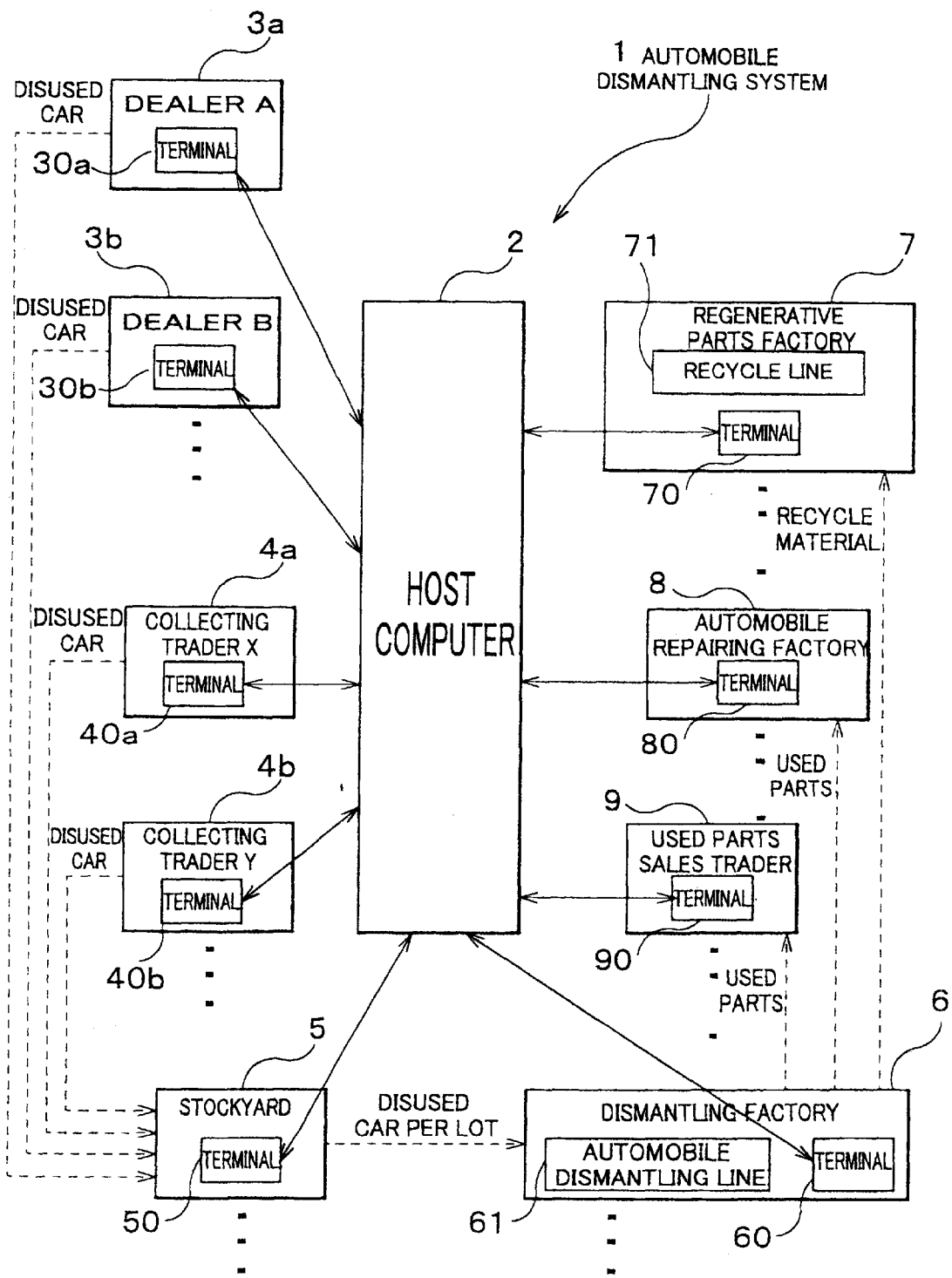
FIG. 1 is a view showing the entire construction of an automobile dismantling system in accordance with an embodiment mode of the present invention.

First, with reference to FIG. 1, the entire construction of the automobile dismantling system 1 will be explained. The automobile dismantling system 1 is constructed by a host computer 2, dealers 3a, 3b, - - - , collecting traders 4a, 4b, - - - , stockyards 5, - - - , dismantling factories 6, - - - , regenerative parts factories 7, - - - - , automobile repairing factories 8, - - - - , used parts sales traders 9, - - - - , etc. Terminals 30a, 30b, 40a, 40b, 50, 60, 70, 80, 90, - - - connected to the host computer 2 are respectively arranged in the dealers 3a, 3b, - - - , the collecting traders 4a, 4b, - - - , the stockyards 5, - - - , the dismantling factories 6, - - - , the regenerative parts factories 7, - - - , the automobile repairing factories 8, - - - , the used parts sales traders 9, - - - , etc. The automobile dismantling system 1 is formed in an area unit able to smoothly collect an automobile as a dismantling object and smoothly supply dismantled parts. The construction of the automobile dismantling system 1 includes the dealers 3a, 3b, - - - , the collecting traders 4a, 4b, - - - , the stockyards 5, - - - , the dismantling factories 6, - - - , the regenerative parts factories 7, - - - , the automobile repairing factories 8, - - - , the used parts sales traders 9, - - - , etc. located within this area.

In this embodiment mode, the dealers 3a, 3b, - - - , and the collecting traders 4a, 4b, - - - correspond to collecting means described in the claims. The regenerative parts factories 7, - - - - , the automobile repairing factories 8, - - - and the used parts sales traders 9, - - - correspond to dismantling parts treating means described in the claims. The collecting means may be also set to another means such as an end user, a used automobile sales company, etc. in addition to the dealers 3a, 3b, - - - and the collecting traders 4a, 4b, - - - -. The dismantling parts treating means may be also set to another means such as a material factory, a dealer, etc. in addition to the regenerative parts factories 7, - - - - , the automobile repairing factories 8, - - - - , and the used parts sales traders 9, - - - -.

The host computer 2 and the terminals 30a, 30b, 40a, 40b, 50, 60, 70, 80, 90, - - - are connected to each other through a dedicated line using WAN (Wide Area Network). In FIG. 1, connection is made only between the host computer 2 and each terminal 30a, - - - , but may be also made between the respective terminals 30a, - - - -.

The host computer 2 generalizes the automobile dismantling system 1, and performs all managements with respect to collection, storage and dismantlement of the automobile, processing of the dismantled parts and supply of insufficient parts, etc. Therefore, the host computer 2 collects information from each terminal 30a, - - - and provides information to each terminal 30a, - - - -. Further, the host computer 2 stores the collected information, and generates providing information from the collected information and the stored information. As mentioned above, the host computer 2 may be arranged in an automobile maker, and may be also arranged in a special company of the automobile dismantlement. When the host computer 2 is arranged in the special company of the automobile dismantlement, an unillustrated terminal of each automobile maker is connected to the host computer 2, and the host computer 2 is constructed such that information such as the automobile maker, a car kind, a grade, registration year and month, parts construction, raw materials of respective constructional parts, a type, the number of recycle times, a reusable limit, a utilization use, etc. with respect to a frame number of each automobile is provided from each automobile maker. The construction of the host computer 2 will be explained later in detail.

The dealers 3a, 3b, - - - trade-in the automobile from a user replacing the automobile with a new one, and the traded-in automobile is supplied to each stockyard 5, - - - as a disused car. The dealers 3a, 3b, - - - collect the automobile as a disused object in addition to the replacement. In the dealers 3a, 3b, - - - , terminals 30a, 30b, - - - are respectively arranged, and transmit and receive information with respect to the traded-in automobile, etc. between these terminals and the host computer 2. The collecting traders 4a, 4b, - - - collect the automobile as a disused object from the user, and supply the collected automobile to each stockyard 5, - - - as a disused car. In the collecting traders 4a, 4b, - - - , terminals 40a, 40b, - - - are respectively arranged, and transmit and receive information with respect to the collected automobile, etc. between these terminals and the host computer 2.

The stockyards 5, - - - temporarily store the automobile (disused car) supplied from the dealers 3a, 3b, - - - and the collecting traders 4a, 4b, - - - , and supply the automobile (disused car) to the dismantling factories 6, - - - every lot. In each stockyard 5, - - - , the automobile is stocked every the same car kind and the same grade. In the stockyards 5, - - - , terminals 50, - - - are respectively arranged, and transmit and receive information with respect to the stocked automobile and a stocking situation, etc. between these terminals and the host computer 2.

Figure 4:
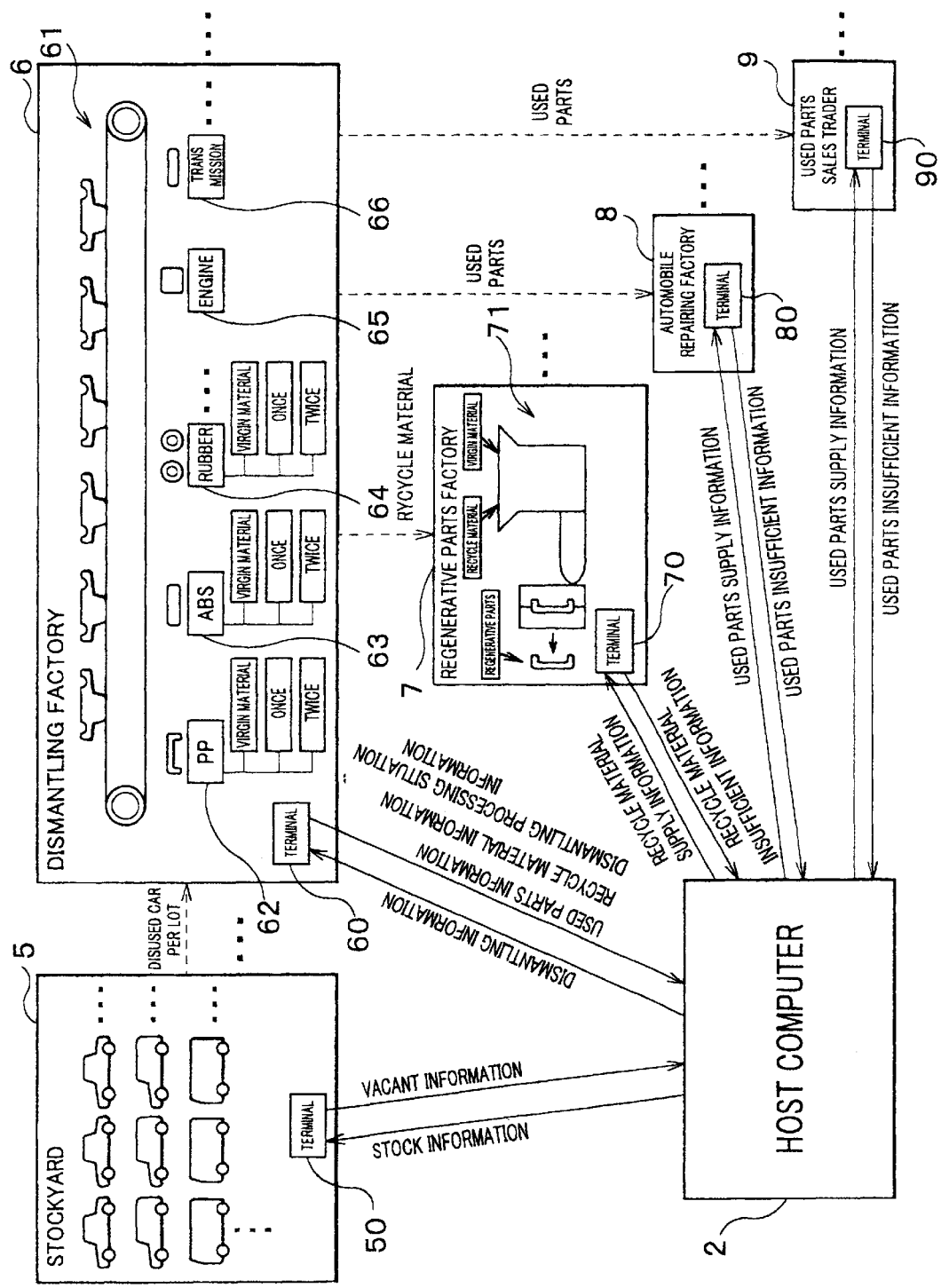
FIG. 4 is a view showing the detailed construction of the automobile dismantling system of FIG. 1 when the automobile is dismantled.

The dismantling factories 6, - - - dismantle the automobile (disused car) supplied from the stockyards 5, - - - on automobile dismantling lines 61, - - - every lot, and supply dismantled parts to the regenerative parts factories 7, - - - , the automobile repairing factories 8, - - - , the used parts sales traders 9 - - - , etc. On each automobile dismantling line 61, - - - the automobile of the same car kind and the same grade (namely, the automobile having the same constructional parts) is continuously dismantled so that the automobile is continuously dismantled in the same dismantling work procedure. On each automobile dismantling line 61, - - - , a dismantled parts classification document is stuck to each automobile, and dismantled parts are classified on the basis of this dismantled parts classification document. Concretely, a PP box 62, an ABS box 63, a rubber box 64, etc. for stocking a recycle material, an engine box 65, a transmission box 66, etc. for stocking used parts, and an unillustrated box for stocking disused parts are arranged on each automobile dismantling line 61, - - - . The dismantled parts are classified into these boxes (see FIG. 4). In particular, in the case of the recycle material, a virgin material, a first recycle material and a second recycle material are classified in accordance with the number of recycle times. Information (raw material or type, the number of recycle times or reusable limit, utilization use) of all constructional parts of the automobile of each lot is described in the dismantled parts classification document, and this document is made on the basis of dismantling information (see FIG. 4). In the dismantling factories 6, - - - , terminals 60 - - - are respectively arranged, and transmit and receive information with respect to the dismantled automobile and a dismantling situation, etc. between these terminals and the host computer 2.

In this embodiment mode, the automobile dismantling lines 61, - - - (dismantling factories 6, - - - ) correspond to dismantling means described in the claims. The dismantled parts are supplied from the dismantling factories 6, - - - to the regenerative parts factories 7, - - - , and are utilized as a recycle material and automobile parts are regenerated on a recycle line 71. The recycle material is generally reduced in strength as the number of recycle times is increased. Accordingly, performance of the recycle material as a raw material is maintained on the recycle line 71 by blending the recycle material and the virgin material (a raw material never used as a recycle material), and adding a reinforcing material (see FIG. 4). For example, with respect to resin parts regenerated on the recycle line 71, the virgin material is injected as an outer cover, and the raw material having the blended recycle material therein is then injected and molded. As the number of recycle times is increased, a blending ratio of the virgin material is increased and an adding amount of the reinforcing material is increased. No recycle material having the number of recycle times equal to or greater than a predetermined number (e.g., three times or more) is used as the raw material of the regenerative parts. In the regenerative parts factories 7, - - - , terminals 70, - - - are respectively arranged, and transmit and receive information with respect to the supplied recycle material and an insufficient recycle material, etc. between these terminals and the host computer 2.

The dismantled parts are supplied from the dismantling factories 6, - - - to the automobile repairing factories 8, - - - , and are practically used as used parts. In the automobile repairing factories 8, - - - , terminals 80, - - - are respectively arranged, and transmit and receive information with respect to the supplied used parts and insufficient used parts, etc. between these terminals and the host computer 2.

The dismantled parts are supplied from the dismantling factories 6, - - - to the used parts sales traders 9, - - - , and are sold as used parts. In the used parts sales traders 9, - - - , terminals 90, - - - are respectively arranged, and transmit and receive information with respect to the supplied used parts and the insufficient used parts, etc. between these terminals and the hot computer 2.

A personal computer, etc. are used in each terminal 30a, - - - connected to the host computer 2, and these terminals 30a, - - - may not be necessarily constructed by a common design. At least information can be inputted and outputted from each terminal 30a, - - - , and each terminal 30a, - - - can transmit and receive information through WAN between this terminal and the host computer 2. Therefore, each terminal 30a, - - - has an unillustrated computer main body, a memory device, an input-output device, a communication controller, etc.

In this embodiment mode, the terminals 30a, 30b, 40a, 40b, - - - arranged in the dealers 3a, 3b, - - - and the collecting traders 4a, 4b, - - - correspond to input means described in the claims.

Figure 2:
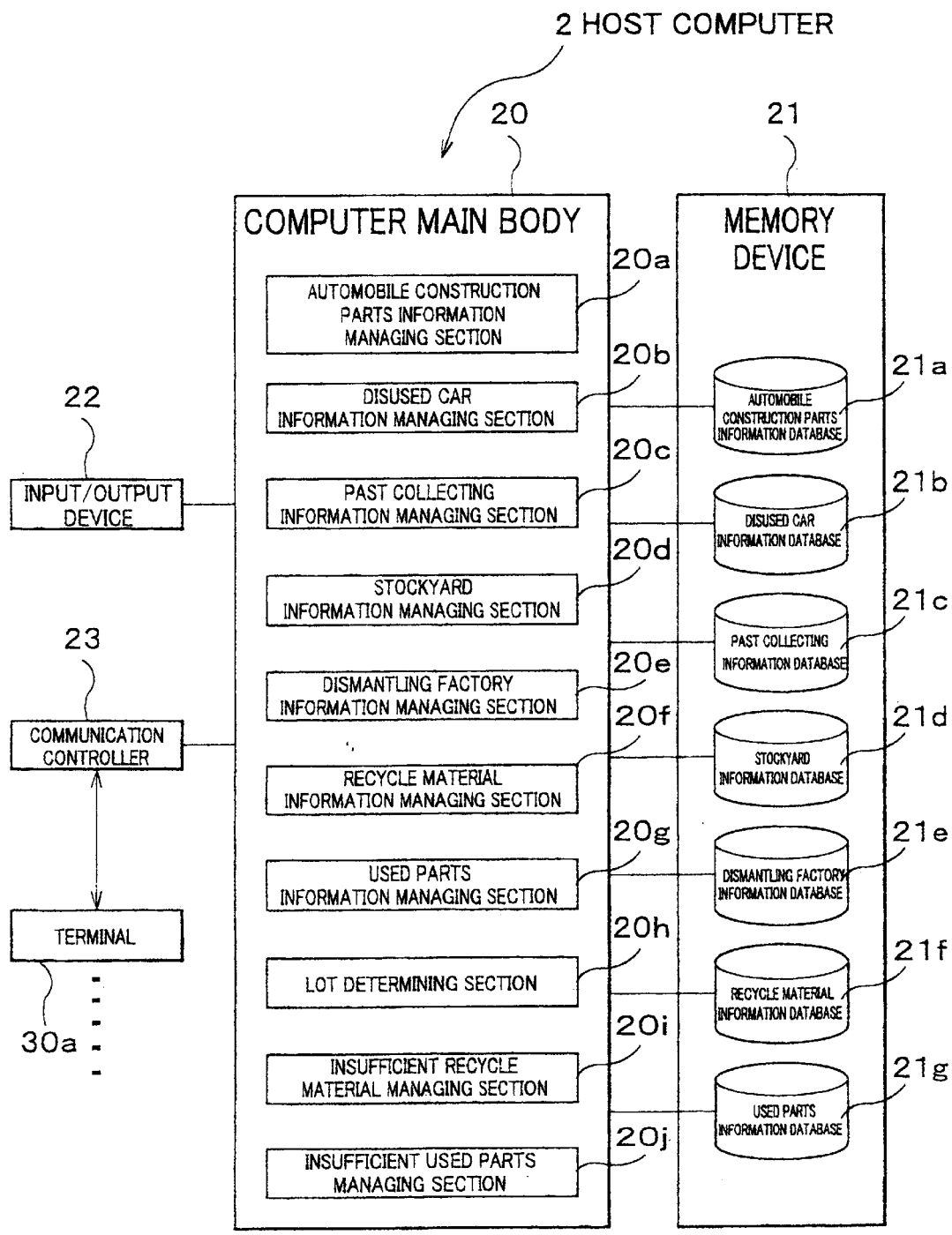
FIG. 2 is a view showing the construction of a host computer shown in FIG. 1.
Figure 3:
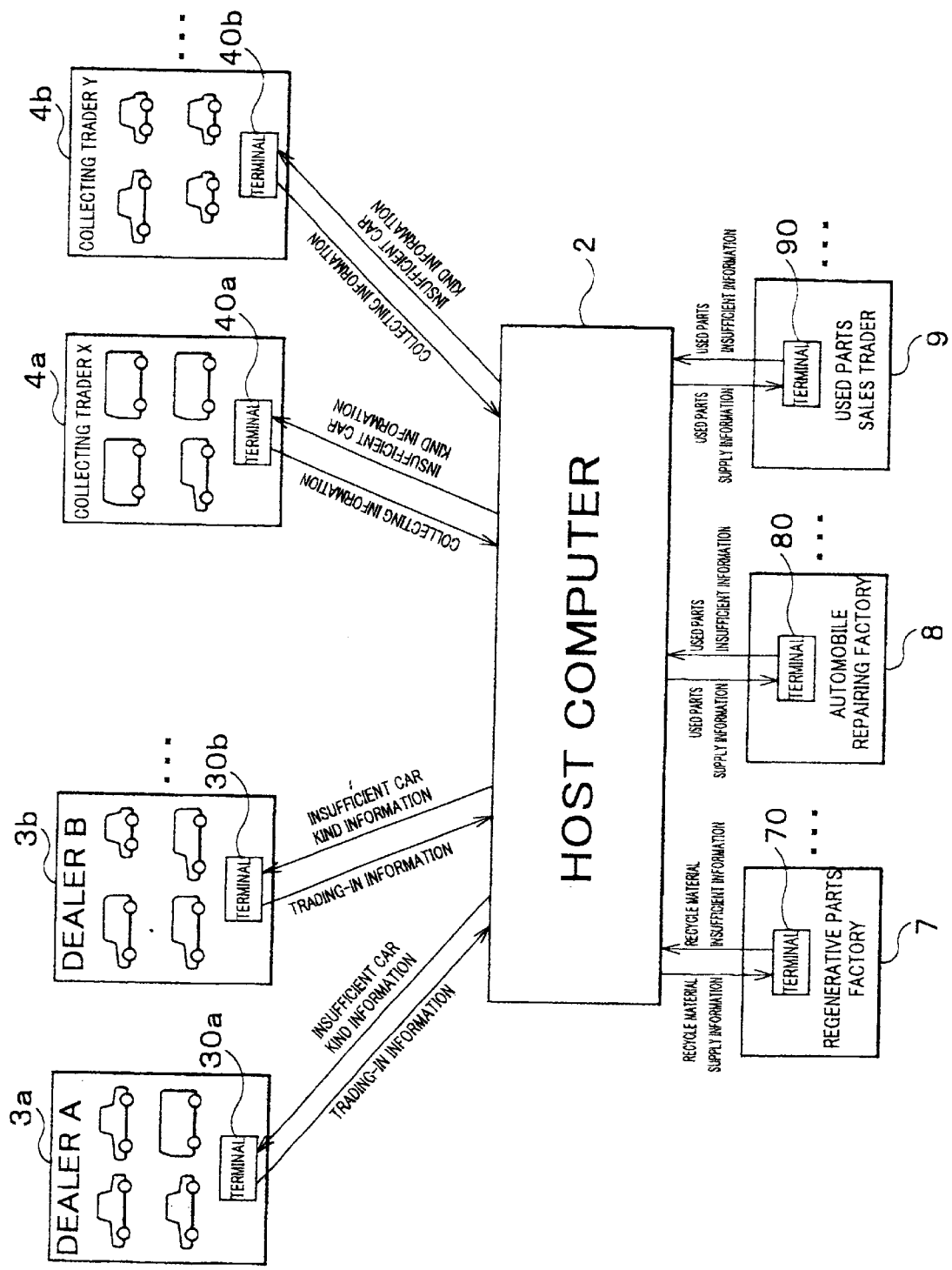
FIG. 3 is a view showing a detailed construction of the automobile dismantling system of FIG. 1 when an automobile is collected.

The construction of the host computer 2 will next be explained in detail with reference to FIG. 2. The host computer 2 is mainly constructed by a computer main body 20, a memory device 21, an input-output device 22 and a communication controller 23. A general purpose computer, a high end personal computer, etc. are used in the host computer 2, and this host computer 2 concentratively manages the automobile dismantling system 1. Therefore, the host computer 2 manages and processes information, and controls a communication line with each terminal 30a, - - - , and gets access to each database, etc.

The computer main body 20 has a CPU (Central Processing Unit), a RAM (Random Access Memory), etc. The computer main body 20 generalizes and controls an operation of the host computer 2, and generalizes each terminal 30a, - - - through the communication controller 23. The computer main body 20 also forms information as a database in the memory device 21, and manages this information, and executes each processing on the basis of this information as the database. When the host computer 2 is started, the computer main body 20 loads an OS (Operating System) stored to the memory device 21 onto the RAM, and executes this OS, and also executes each of an application program and a communication control program stored to the memory device 21 in the OS.

The computer main body 20 also has an automobile constructional parts information managing section 20a, a disused car information managing section 20b, a past collection information managing section 20c, a stockyard information managing section 20d, a dismantling factory information managing section 20e, a recycle material information managing section 20f, a used parts information managing section 20g, a lot determining section 20h, an insufficient recycle material managing section 20i and an insufficient used parts managing section 20j as applications to generalize the automobile dismantling system 1. The construction of each section will be explained later in detail.

In this embodiment mode, the stockyard information managing section 20d and the lot determining section 20h correspond to lot determining means described in the claims. The insufficient recycle material managing section 20i and the insufficient used parts managing section 20j correspond to insufficient recycle parts managing means described in the claims.

The memory device 21 is constructed by a hard disk unit, a magnetooptic disk unit, etc. The memory device 21 stores the OS, the communication control program and application programs of the automobile constructional parts information managing section 20a, the disused car information managing section 20b, the past collection information managing section 20c, the stockyard information managing section 20d, the dismantling factory information managing section 20e, the recycle material information managing section 20f, the used parts information managing section 20g, the lot determining section 20h, the insufficient recycle material managing section 20i and the insufficient used parts managing section 20j mentioned above. In the memory device 21, an automobile constructional parts information database 21a, a disused car information database 21b, a past collecting information database 21c, a stockyard information database 21d, a dismantling factory information database 21e, a recycle material information database 21f and a used parts information database 21g are constructed to generalize and manage information of the automobile dismantling system 1. The construction of each database will be explained later in detail.

In this embodiment mode, the automobile constructional parts information database 21a corresponds to a product information database described in the claims. The memory device 21 (disused car information database 21b) corresponds to memory means described in the claims. The past collecting information database 21c corresponds to a past collecting information database described in the claims.

The input-output device 22 is constructed by a display, a keyboard, a mouse, etc., and is connected through an I/O device. Information with respect to each automobile is inputted to the input-output device 22, and the input-output device 22 outputs a collecting situation, a stocking situation, a dismantling situation, a dismantled parts situation, etc.

The communication controller 23 is constructed by a modem, etc., and is connected to each terminal 30a, - - - through the WAN. The communication controller 23 controls transmission and reception of information with respect to each terminal 30a, - - - .

Each database will next be explained with reference to FIGS. 5 to 11.

First, the automobile constructional parts information database 21a will be explained with reference to FIG. 5. Information with respect to all automobiles registered at present on the basis of information from an automobile maker is set to the automobile constructional parts information database 21a. Information able to specify an automobile kind in accordance with information able to discriminate each automobile, and information of constructional parts of the automobile are also set to this automobile constructional parts information database 21a. Information with respect to the automobile deleted in registration is erased from the automobile constructional parts information database 21a. This automobile constructional parts information database 21a has setting items of "frame number", "automobile maker", "car kind", "grade", "registration year and month", "constructional parts", "raw material or type", "the number of recycle times or reusable limit" and "utilization use". The "frame number" is a unique number given to each of all manufactured automobiles so that each automobile can be specified by this frame number. Therefore, other setting items are set in accordance with the "frame number", in the automobile constructional parts information database 21a. The "automobile maker", "car kind" and "grade" are information for specifying a kind (product kind) of each automobile. Accordingly, if the automobile has the same automobile maker, the same car kind and the same grade, all the constructional parts are the same or approximately the same, and are assembled in the same procedure or the approximately same procedure. Since an optional product is mounted to the automobile in accordance with a user and the automobile is remodeled, etc., all the constructional parts are not necessarily the same even when the automobile maker, the car kind and the grade are the same. Further, if the automobile has the same automobile maker and the same car kind (this case corresponds to a case in which the kind of the automobile is approximately the same), all the constructional parts are approximately the same and are assembled approximately by the same procedure. The "registration year and month" are registered year and month of each automobile. The "constructional parts" are all constructional parts of each automobile. The "raw material or type", the "the number of recycle times or reusable limit" and the "utilization use" are set in accordance with each constructional part of the "constructional parts". The "raw material or type" is a raw material of each constructional part when the constructional part can be used as a recycle material, and a type of each constructional part when the constructional part can be used as used parts. "The number of recycle times or reusable limit" is the number of using times as a recycle material when the constructional part can be used as the recycle material, and is the number of years or a running distance of a reusable limit when the constructional part can be used as used parts. With respect to the number of recycle times, the constructional part is set to a virgin material when no constructional part is never used as a recycle material. When the number of recycle times is set to three times or more, no constructional part is used as the recycle material in consideration of strength as a raw material, etc. The reusable limit year number or running distance is a reference value for unusing the constructional part as used parts if the dismantled automobile (disused car) exceeds a value of the reusable limit year number or the running distance. The "utilization use" is utilization use of each constructional part after the dismantlement, and one of the recycle material, the used parts and disuse is set. When the number of recycle times is three times or more, the disuse is set even when the constructional part can be used as the recycle material. Further, the disuse is also set when the constructional part can be used as the used parts but exceeds the reusable limit (for example, 7 years or 70,000 km). In setting of the disuse, reclamation, reclamation after crush, and reclamation after burning-up may be also set in more detail. Further, a dismantling work procedure may be also set in accordance with each constructional part although this procedure is set in the automobile constructional parts information database 21a.

In this embodiment mode, the frame number corresponds to identification number described in the claims, and the car kind (accordingly, automobile maker) and the grade correspond to product kind information described in the claims.

The disused car information database 21b will next be explained with reference to FIG. 6. Information with respect to the automobile (disused car) scheduled to be dismantled on the basis of trading-in information from the dealers 3a, 3b, - - - and collecting information from the collecting traders 4a, 4b, - - - , and information with respect to the dismantlement of each automobile managed by the host computer 2 are set-to the disused car information database 21b. Information with respect to the automobile dismantled in the dismantling factories 6, - - - is erased from the disused car information database 21b. The disused car information database 21b has setting items of "frame number", "treating trader", "disused year and month", "running distance", "insufficient parts", "lot number", "stockyard" and "dismantling factory". The "frame number" is information necessary to specify an automobile kind, and can specify the automobile maker, the car kind and the grade. Other setting items are set in accordance with the "frame number" in the disused car information database 21b. The "treating trader" is a trader inputting information with respect to the automobile (disused car) scheduled to be dismantled, and is one of the dealers 3a, 3b, - - - and the collecting traders 4a, 4b, - - - . The "disused car year and month" are deleted year and month of registration of each automobile. The "running distance" is a running distance at a collecting time of each automobile. The "insufficient parts" are information of parts detached from the automobile at the collecting time. The "lot number" is a number showing a lot of the automobile of the same automobile maker, the same car kind and the same grade scheduled to be dismantled, and is determined by the lot determining section 20h. The "stockyard" is one of the stockyards 5, - - - for temporarily stocking each automobile, and is determined by the stockyard information managing section 20d. The "dismantling factory" is one of the dismantling factories 6, - - - for dismantling each automobile, and is determined by the lot determining section 20h.

The past collecting information database 21c will next be explained with reference to FIG. 7. A past collecting situation of the automobile (disused car) dismantled on the basis of information of the disused car information database 21b is set to the past collecting information database 21c. A past monthly collected car number with respect to the automobile of the same car kind and the same grade is set to the past collecting information database 21c. The past collecting information database 21c has setting items of "car kind", "grade" and "collected car number". The "car kind" and the "grade" are information for specifying the kind (product kind) of each automobile, and are set by the past collection information managing section 20c. The "collected car number" is a monthly collected car number for the past three years with respect to the same car kind and the same grade, and is set by the past collection information managing section 20c.

The stockyard information database 21d will next be explained with reference to FIG. 8. Information with respect to storage of the automobile managed by the host computer 2 is set to the stockyard information database 21d. Information with respect to the lot supplied to the dismantling factories 6, - - - is erased from the stockyard information database 21d. The stockyard information data base 21d has setting items of "stockyard"; "stock area"; "car kind", "grade", "car number", "occupying area", "lot number", and "dismantling start schedule day" as "stock situation"; and "vacant area". The "stockyard" is one of the stockyards 5, - - -, and is set by the stockyard information managing section 20d. The "stock area" is an area for stocking the automobile in each stockyard 5, - - -, and is set by the stockyard information managing section 20d. The "car kind" and the "grade" are information for specifying the kind (product kind) of each automobile, and is set by the stockyard information managing section 20d. The "car number" is the number of automobiles of the same car kind and the same grade stocked at present, and is set by the stockyard information managing section 20d. The "occupying area" is an area occupied at present by the automobile of the same car kind and the same grade, and is set by the stockyard information managing section 20d. The "lot number" is a lot number when the lot is determined in the same car kind and the same grade, and is determined by the lot determining section 20h. The "dismantling start schedule day" is schedule month and day for starting the dismantlement when the lot is determined in the same car kind and the same grade, and is determined by the dismantling factory information managing section 20e. The "vacant area" is a vacant area in each stockyard 5, - - -, and is set by the stockyard information managing section 20d.

The dismantling factory information database 21e will next be explained with reference to FIG. 9. Information with respect to dismantlement of the automobile managed by the host computer 2 is set to the dismantling factory information database 21e. Information with respect to the lot dismantled in the dismantling factories 6, - - - is erased from the dismantling factory information database 21e. The dismantling factory information database 21e has setting items of "dismantling factory", "processing ability", "lot number", "car number", and "dismantling termination schedule day" as "lot being processed"; and "lot number", "car number" and "dismantling start schedule day" as "processing schedule lot". The "dismantling factory" is one of the dismantling factories 6, - - - -. The "processing ability" is dismantling ability in each dismantling factory 6, - - -, and is a dismantled car number per one day or one hour. Since the processing ability is different in accordance with constructional parts of the dismantled automobile, etc., the processing ability may be also set in more detail in consideration of the car kind, etc. The "lot number" of the "lot being processed" is the number of a lot dismantled and processed at present, and is set by the dismantling factory information managing section 20e. The "car number" of the "lot being processed" is a car number of the lot dismantled and processed at present, and is set by the dismantling factory information managing section 20e. The "dismantling termination schedule day" of the "lot being processed" is dismantling termination schedule month and day of the lot dismantled and processed at present, and is set by the dismantling factory information managing section 20e. The "lot number" of the "processing schedule lot" is the number of a lot scheduled to be dismantled, and is set by the dismantling factory information managing section 20e. The "car number" of the "processing schedule lot" is a car number of the lot scheduled to be dismantled, and is set by the dismantling factory information managing section 20e. The "dismantling start schedule day" of the "processing schedule lot" is dismantling start schedule month and day of the lot scheduled to be dismantled, and is set by the dismantling factory information managing section 20e.

The recycle material information database 21f will next be explained with reference to FIG. 10. Information with respect to a recycle material able to be supplied within the automobile dismantling system 1 managed by the host computer 2 is set to the recycle material information database 21f. Information with respect to the recycle material supplied to the regenerative parts factories 7, - - -, etc. is erased from the recycle material information database 21f. The recycle material information database 21f has setting items of "recycle material", "dismantling factory or stockyard", "the number of recycle times" and "amount". The "recycle material" is a raw material of parts able to be utilized as the recycle material among constructional parts of the automobile, and is also a thermoplastic raw material of PP (polypropylene), ABS, etc. The "dismantling factory or stockyard" is one of the dismantling factories 6, - - - able to supply the set recycle material, or one of the stockyards 5, - - - stocking the automobile having the set recycle material (constructional parts), and is set by the recycle material information managing section 20f. "The number of recycle times" is the number of recycle times of the recycle material (constructional parts) able to be supplied, and is set by the recycle material information managing section 20f. The "amount" is an amount of the recycle material (constructional parts) able to be supplied, and is set by the recycle material information managing section 20f.

The used parts information database 21g will next be explained with reference to FIG. 11. Information with respect to used parts able to be supplied within the automobile dismantling system 1 managed by the host computer 2 is set to the used parts information database 21g. Information with respect to the used parts supplied to the automobile repairing factories 8, - - -, the used parts sales traders 9, - - -, etc. is erased from the used parts information database 21g. The used parts information database 21g has setting items of "used parts", "dismantling factory or stockyard", "type", "using year and month", and "running distance". The "used parts" are parts able to be reused as used parts among the constructional parts of the automobile, and are an engine, a transmission, etc. The "dismantling factory or stockyard" is one of the dismantling factories 6, - - - able to supply the set used parts, or one of the stockyards 5, - - - stocking the automobile having the set used parts (constructional parts), and is set by the used parts information managing section 20g. The "type" is a type of the used parts (constructional parts) able to be supplied, and is set by the used parts information managing section 20g. The "using year and month" is using year and month of the automobile having the used parts (constructional parts) able to be supplied, and is set by the used parts information managing section 20g. The "running distance" is a running distance of the automobile having the used parts (constructional parts) able to be supplied, and is set by the used parts information managing section 20g.

Each portion of the computer main body 20 will next be explained with reference to FIGS. 2 to 11.

The automobile constructional parts information managing section 20a is a processing section in which an automobile constructional parts information managing program stored to the memory device 21 is loaded onto a RAM of the computer main body 20, and is executed by a CPU so that each processing is performed. The automobile constructional parts information managing section 20a makes, changes and erases data of the automobile constructional parts information database 21a, etc. on the basis of information of each automobile from an automobile maker. The information of each automobile is information such as an automobile maker, a car kind, a grade, registration year and month, a parts construction, a raw material or type of each constructional part, the number of recycle times or reusable limit, a utilization use, etc. with respect to a frame number of each automobile. The automobile constructional parts information managing section 20*a* sets each data of the automobile constructional parts information database 21*a* every time the automobile constructional parts information managing section 20*a* obtains information of a new automobile from the automobile maker. The information of the registration year and month may be also obtained from the dealers 3*a*, 3*b*, - - - .

The disused car information managing section 20*b* is a processing section in which a disused car information managing program stored to the memory device 21 is loaded onto the RAM of the computer main body 20, and is executed by the CPU so that each processing is performed. The disused car information managing section 20*b* makes, changes and erases data of the disused car information database 21*b*, etc. on the basis of trading-in information transmitted from each terminal 30*a*, 30*b*, - - - of the dealers 3*a*, 3*b*, - - - and collecting information transmitted from each terminal 40*a*, 40*b*, - - - of the collecting traders 4*a*, 4*b*, - - - (see FIG. 3). The trading-in information and the collecting information are information of the frame number of the collected automobile (disused car), a treating trader, disuse year and month, a running distance and detached parts. Automobiles of various car kinds and grades are collected in the dealers 3*a*, 3*b*, - - - and the collecting traders 4*a*, 4*b*, - - - , but all the frame numbers of the respective automobiles are different from each other so that the automobiles can be individually specified. The disused car information managing section 20*b* sets data of "frame number", "treating trader", "disuse year and month", "running distance" and "insufficient parts" of the disused car information database 21*b* every time the trading-in information or the collecting information is transmitted. Further, the disused car information managing section 20*b* sets the "lot number" and the "dismantling factory" of the disused car information database 21*b* every time the lot and the dismantling factory are determined in the lot determining section 20*h*, and also sets the "stockyard" every time the stockyard 5 is determined in the stockyard information managing section 20*d* (see FIG. 6).

The past collecting information managing section 20*c* is a processing section in which a past collecting information managing program stored to the memory device 21 is loaded onto the RAM of the computer main body, and is executed by the CPU so that each processing is performed. The past collecting information managing section 20*c* makes, changes and erases data of the past collecting information database 21*c*, etc. on the basis of data of the automobile constructional parts information database 21*a* and the disused car information database 21*b*. The past collecting information managing section 20*c* specifies the car kind and the grade from the frame number of an automobile (disused car) newly collected on the basis of the automobile constructional parts information database 21*a* every time data of this automobile (disused car) is set to the disused car information database 21*b*. The past collecting information managing section 20*c* updates the car number in a newest month in the column of a "collected car number" corresponding to the specified car kind and grade in the past collecting information database 21*c* (see FIG. 7). The stockyard information managing section 20*d* is a processing section in which a stockyard information managing program stored to the memory device 21 is loaded onto the RAM of the computer main body 20, and is executed by the CPU so that each processing is performed. The stockyard information managing section 20*d* makes, changes and erases data of the stockyard information database 21*d*, etc. on the basis of vacant information from the stockyards 5, - - - , data of the disused car information database 21*b*, etc., and also transmits stock information to terminals 50, - - - of the stockyards 5, - - - (see FIG. 4). The vacant information is each occupying area occupied by the automobile of the same car kind and the same grade at present in each stockyard 5, - - - , and the present vacant area of each stockyard 5, - - - . First, the stockyard information managing section 20*d* sets the "stockyard" and the "stock area" of the stockyard information database 21*d* every time a new stockyard 5 is arranged (see FIG. 8). The stockyard information managing section 20*d* specifies the car kind and the grade from the frame number of an automobile (disused car) newly collected on the basis of the automobile constructional parts information database 21*a* every time data of this automobile (disused car) is set to the disused car information database 21*b*. If the car kind is different, the automobile maker is also different. Accordingly, if the car kind is specified, the automobile maker is also specified. Further, the stockyard information managing section 20*d* specifies the stockyard 5, - - - stocking the automobile of the specified car kind and grade, and adds one to the column of the "car number" of the stockyard information database 21*d*. When no automobile of the specified car kind and grade is stocked to all the stockyards 5, - - - , the stockyard information managing section 20*d* determines the stockyard 5, - - - stocking this automobile of the car kind and the grade in consideration of a vacant area, and newly sets the columns of "car kind", "grade" and "car number" of the stockyard information database 21*d* (see FIG. 8). Further, the stockyard information managing section 20*d* updates the data of "occupying area" and "vacant area" of the stockyard information database 21*d* every time vacant information is transmitted (see FIG. 8). The stockyard information managing section 20*d* also sets "lot number" and "dismantling start day" of the stockyard information database 21*d* every time the lot is determined in the lot determining section 20*h* (see FIG. 8). Further, the stockyard information managing section 20*d* transmits pertinent data of the stockyard information database 21*d* to a pertinent stockyard 5 as stock information every time data of the stockyard information database 21*d* are updated (see FIG. 4). Information of the automobile conveyed from the dealers 3*a*, 3*b*, - - - and the collecting traders 4*a*, 4*b*, - - - , and information of the automobile every lot supplied to the dismantling factories 6, - - - are obtained in each stockyard 5, - - - on the basis of the stock information, and a stock space is practically used efficiently in each stockyard 5, - - - . The dismantling factory information managing section 20*e* is a processing section in which a dismantling factory information managing program stored to the memory device 21 is loaded onto the RAM of the computer main body 20, and is executed by the CPU so that each processing is performed. The dismantling factory information managing section 20*e* makes, changes and erases data of the dismantling factory information database 21*e*, etc. on the basis of dismantling processing situation information from the dismantling factories 6, - - - , data of the disused car information database 21*b*, etc., and transmits dismantling information to respective terminals 60, - - - of the dismantling factories 6, - - - (see FIG. 4). The dismantling processing situation information is the present dismantling situation of each dismantling factory 6, - - - with respect to each lot. First, the dismantling factory information managing section 20*e* sets "dismantling factory" and "processing ability" of the dismantling factory information database 21*e* every time a new dismantling factory 6 is arranged (see FIG. 9). The dismantling factory information managing section 20e sets each data of "processing schedule lot" of the dismantling factory information database 21e every time the lot is determined in the lot determining section 20h (see FIG. 9). The dismantling factory information managing section 20e sets "dismantling start schedule day" of the "processing schedule lot" in consideration of the processing ability of each dismantling factory 6, - - -, the dismantling processing situation information, the other lots scheduled to be processed, etc. Further, the dismantling factory information managing section 20e determines the next lot to be dismantled by the dismantling processing situation information every time the dismantlement of all automobiles of lots being dismantled is terminated, and updates each data of "lot being processed" of the dismantling factory information database 21e to data of the next dismantling lot (see FIG. 9) The dismantling factory information managing section 20e sets "dismantling termination schedule day" of the "lot being processed" in consideration of the processing ability of each dismantling factory 6, - - -, etc. The dismantling factory information managing section 20e preferentially determinedly sets the lot of the automobile having insufficient recycle material and used parts as constructional parts to the next dismantling lot on the basis of information of the insufficient recycle material managing section 20i and the insufficient used parts managing section 20j. Further, the dismantling factory information managing section 20e transmits pertinent data of the dismantling factory information database 21e to a pertinent dismantling factory 6 as dismantling information every time data of the dismantling factory information database 21e are updated. The dismantling factory information managing section 20e adds information (raw material or type, the number of recycle times or reusable limit and utilization use) of all constructional parts of the automobile of each lot, and a dismantling work procedure as the dismantling information on the basis of the automobile constructional parts information database 21a. Each dismantling factory 6, - - - obtains information of the dismantled lot on the basis of the dismantling information, and makes a dismantling schedule, and finely classifies dismantled parts.

The recycle material information managing section 20f is a processing section in which a recycle material information program stored to the memory device 21 is loaded onto the RAM of the computer main body 20, and is executed by the CPU so that each processing is performed. The recycle material information managing section 20f makes, changes and erases data of the recycle material information database 21f, etc. on the basis of recycle material information from the dismantling factories 6, - - -, data of the automobile constructional parts information database 21a and the stockyard information database 21d, etc. (see FIG. 4). The recycle material information is information such as the number of recycle times, an amount, etc. of PP, ABS, etc. as a recycle material stocked at present to each dismantling factory 6, - - -, and also includes information of the recycle material obtained from the lot dismantled at present. First, the recycle material information managing section 20f sets the "recycle material" of the recycle material information database 21f on the basis of the automobile constructional parts information database 21a, and also sets the "dismantling factory or stockyard" every time a new stockyard 5 or dismantling factory 6 is arranged (see FIG. 10). The recycle material information managing section 20f updates "the number of recycle times" and the "amount" in accordance with the recycle material of a pertinent dismantling factory 6 of the recycle material information database 21f every time the recycle material information is transmitted (see FIG. 10).

The recycle material information managing section 20f also specifies the recycle material obtained from the constructional parts of an automobile newly stocked, and the number of recycle times and the amount of the recycle material on the basis of the automobile constructional parts information database 21a every time the stockyard information database 21d is updated. Further, the recycle material information managing section 20f updates "the number of recycle times" and the "amount" in accordance with the recycle material of a pertinent stockyard 5 of the recycle material information database 21f (see FIG. 10). With respect to the recycle material having the number of recycle times equal to or greater than three times, no recycle material information managing section 20f sets the number of recycle times and the amount to the recycle material information database 21f in consideration of strength as a raw material.

The used parts information managing section 20g is a processing section in which a used parts information managing program stored to the memory device 21 is loaded onto the RAM of the computer main body 20, and is executed by the CPU so that each processing is performed. The used parts information managing section 20g makes, changes and erases data of the used parts information database 21g, etc. on the basis of used parts information from the dismantling factories 6, - - -, data of the automobile constructional parts information database 21a and the stockyard information database 21d, etc. (see FIG. 4). The used parts information is information of a type, a using year number and a running distance of the used parts stocked at present to each dismantling factory 6, - - -, and also includes information of the used parts obtained from a lot being dismantled at present. First, the used parts information managing section 20e sets "used parts" of the used parts information database 21g on the basis of the automobile constructional parts information database 21a, and also sets the "dismantling factory or stockyard" every time a new stockyard 5 or dismantling factory 6 is arranged (see FIG. 11) The used parts information managing section 20g updates the "type", the "using year number" and the "running distance" in accordance with the used parts of a pertinent dismantling factory 6 of the used parts information database 21g every time the used parts information is transmitted (see FIG. 11). The used parts information managing section 20g specifies the used parts obtained from the constructional parts of an automobile newly stocked, and the type of the used parts on the basis of the automobile constructional parts information database 21a every time the stockyard information database 21d is updated. Further, the used parts information managing section 20g specifies the using year number and the running distance on the basis of the disused car information database 21b, and updates the "type", the "using year number" and the "running distance" in accordance with the used parts of a pertinent stockyard 5 of the used parts information database 21g (see FIG. 11). When the using year number or the running distance of the constructional parts of the dismantled automobile exceeds the year number or the running distance of a reusable limit of the "reusable limit" of the automobile constructional parts information database 21a (see FIG. 5), no used parts information managing section 20g sets the using year number or the running distance to the used parts information database 21g in consideration of durability as the used parts.

The lot determining section 20h is a processing section in which a lot determining program stored to the memory device 21 is loaded onto the RAM of the computer main body 20, and is executed by the CPU so that each processing is performed. When the number of automobiles (disused cars) of the same car kind (therefore, the same automobile maker) and the same grade reaches a lot car number, the lot determining section 20h determines the lot car number of automobiles of the same car kind and the same grade as a lot as a dismantling unit on the basis of data of the stockyard information database 21d, and gives the lot number. Namely, in the case of the automobiles of the same car kind and the same grade, the same constructional parts are arranged and assembled in the same assembly procedure. Therefore, since a dismantling work procedure is the same and dismantled parts are also the same, the lot car number of automobiles of the same car kind and the same grade is set to the dismantling unit. The lot car number is an optimum dismantled car number when the automobiles of the same car kind and the same grade are continuously dismantled. The lot car number is set by each stock area of the stockyards 5, - - - for stocking the dismantled automobiles, dismantling ability of each automobile dismantling line 61, - - - of the dismantling factories 6, - - - , etc. As the lot car number is increased, dismantling efficiency on each automobile dismantling line 61, - - - is improved, but a time and a stock space for collecting a lot car number of automobiles are required. Further, when the number of automobiles (disused cars) of the same car kind and the same grade does not reach the lot car number, but can be estimated to reach the lot car number during several days on the basis of data of the past collecting information database 21c, the lot determining section 20h determines the number of automobiles of the same car kind and the same grade smaller than the lot car number as a lot as the dismantling unit, and gives the lot number. Namely, since a past collected car number every the same car kind and the same grade is monthly recorded to the past collecting information database 21c, a collected car number in an arbitrary month can be estimated on the basis of this information. Estimation probability can be further improved if a past monthly registered car number every the same car kind and the same grade is recorded in addition to a past collected car number. Further, when the lot determining section 20h determines the lot, the lot determining section 20h determines one of the dismantling factories 6, - - - for dismantling the automobile of this lot. This dismantling factory is determined in consideration of position relations of the stockyards 5, - - - and the dismantling factories 6, - - -, the situation of a processing schedule lot in each dismantling factory 6, - - - , etc. The lot determining section 20h preferentially determinedly sets the automobile having insufficient recycle material and used parts as constructional parts to the lot on the basis of information of the insufficient recycle material managing section 20i and the insufficient used parts managing section 20j. In this case, there is also a case in which the lot car number is set to be smaller than a normal lot car number so as to early supply the insufficient recycle material and used parts.

The insufficient recycle material managing section 20i is a processing section in which an insufficient recycle material managing program stored to the memory device 21 is loaded onto the RAM of the computer main body 20, and is executed by the CPU so that each processing is performed. The insufficient recycle material managing section 20i transmits recycle material supply information to the regenerative parts factory 7 every time recycle material insufficient information is transmitted from the regenerative parts factory 7 (see FIG. 4). The recycle material insufficient information is information such as the kind of an insufficient recycle material, its amount, etc. in each regenerative parts factory 7. The recycle material supply information is information of the insufficient recycle material in the recycle material information database 21f. The regenerative parts factory 7 obtains information of the insufficient recycle material on the basis of the recycle material supply information. When the insufficient recycle material is in store, the regenerative parts factory 7 preengages the insufficient recycle material to the host computer 2 or the dismantling factories 6, - - - , and the stockyards 5, - - - . When there is no insufficient recycle material in the dismantling factories 6, - - - and the stockyards 5, - - - , the insufficient recycle material managing section 20i specifies the kind and the grade of an automobile having the insufficient recycle material as constructional parts on the basis of the automobile constructional parts information database 21a. The insufficient recycle material managing section 20i then transmits information of these specified car kind and grade to the dealers 3a, 3b, - - - and the collecting traders 4a, 4b, - - - as insufficient car kind information (see FIG. 3). The dealers 3a, 3b, - - - and the collecting traders 4a, 4b, - - - present trading-in and collecting prices higher than normal trading-in and collecting prices to a user so as to rapidly collect the automobile of these specified car kind and grade, and early collect the automobile (therefore, the insufficient recycle material) of these specified car kind and grade. Namely, there is no cost loss even when the automobile is collected at a slightly high price since dismantled parts are utilized as a recycle material without storing the dismantled parts as stock. This is because there is no storing cost and the recycle material can be purchased at a higher price in the regenerative parts factory 7.

The insufficient used parts managing section 20j is a processing section in which an insufficient used parts managing program stored to the memory device 21 is loaded onto the RAM of the computer main body 20, and is executed by the CPU so that each processing is performed. The insufficient used parts managing section 20j transmits used parts supply information to an automobile repairing factory 8 or a used parts sales trader 9 every time used parts insufficient information is transmitted from the automobile repairing factory 8 or the used parts sales trader 9 (see FIG. 4). The used parts insufficient information is information such as the type of used parts, etc. insufficient in the automobile repairing factory 8 or the used parts sales trader 9. The used parts supply information is information of the used parts insufficient within the used parts information database 21g. The automobile repairing factory 8 or the used parts sales trader 9 obtains information of the insufficient used parts on the basis of the used parts supply information, and preengages the insufficient used parts to the host computer 2 or the dismantling factories 6, - - - and the stockyards 5, - - - when the insufficient used parts are in stock. When there are no insufficient used parts in the dismantling factories 6, - - - and the stockyards 5, - - - , the insufficient used parts managing section 20j specifies the kind and the grade of an automobile having the insufficient used parts as constructional parts on the basis of the automobile constructional parts information database 21a. The insufficient used parts managing section 20j then transmits information of these specified car kind and grade to the dealers 3a, 3b, - - - and the collecting traders 4a, 4b, - - - as insufficient car kind information (see FIG. 3). The dealers 3a, 3b, - - - and the collecting traders 4a, 4b, - - - present trading-in and collecting prices higher than normal trading-in and collecting prices to a user so as to rapidly collect the automobile of these specified car kind and grade, and early collect the automobile (therefore, the insufficient used parts) of these specified car kind and grade. Namely, there is no cost loss even when the automobile is collected at a slightly high price since dismantled parts are utilized as used parts without storing the dismantled parts as stock. This is because there is no storing cost and the automobile repairing factory 8 or the used parts sales trader 9 purchases the used parts at a higher price.

In accordance with this automobile dismantling system 1, the automobile of the same automobile maker, the same car kind and the same grade is continuously dismantled every lot car number so that a dismantling work can be made in the same dismantling work procedure. Therefore, it is not necessary for a worker to pass a tool from one hand to the other, change a working order, and change the construction of the automobile dismantling line 61 so that dismantling work efficiency is improved. Furthermore, the automobile dismantling system 1 can also start the dismantlement when the car number is smaller than the lot car number, but is expected to reach the lot car number in a few days. Accordingly, stocking time can be shortened in the stockyards 5, - - - so that stock area can be reduced in the stockyards 5, - - - . The automobile dismantling system 1 can early supply the insufficient recycle material or used parts in accordance with wishes of the regenerative parts factory 7, the automobile repairing factory 8 or the used parts sales trader 9, etc. Further, when there is no insufficient recycle material or used parts, the automobile dismantling system 1 preferentially collects the automobile having this recycle material and the used parts. Accordingly, the recycle material and the used parts do not almost become insufficient in the regenerative parts factory 7, the automobile repairing factory 8 or the used parts sales trader 9, etc. Therefore, the entire automobile dismantling system 1 is efficiently operated, and the recycle material and the used parts are not stored as stock for a long period. Further, in the automobile dismantling system 1, dismantled parts are finely classified on the automobile dismantling line 61 on the basis of data of the automobile dismantled parts information database 21a so that the dismantled parts can be effectively practically used at its maximum, and can be efficiently supplied to the regenerative parts factory 7, the automobile repairing factory 8 or the used parts sales trader 9. An automobile dismantling method using the automobile dismantling system 1 will next be explained with reference to FIGS. 12 to 14. FIGS. 1 to 11 are referred in accordance with the explanation at any time. Here, a method for determining a lot, a managing method with respect to an insufficient recycle material, and a managing method with respect to insufficient used parts will be explained here as the automobile dismantling method.

First, the lot determining method will be explained along the flow chart of FIG. 12. The dealers 3a, 3b, - - - and the collecting traders 4a, 4b, - - - transmit trading-in information or collecting information to the host computer 2 every time a disused automobile is collected. Thus, The host computer 2 receives this trading-in information or collecting information, and sets a frame number of the dismantled automobile (disused car), etc. to the disused car information database 21b (S10).

Further, the host computer 2 specifies the car kind and the grade from the frame number set to the disused car information database 21b on the basis of the automobile constructional parts information database 21a (S11). Subsequently, the host computer 2 retrieves a stockyard 5 stocking the automobile of the specified car kind and grade on the basis of the stockyard information database 21d. When there is a stockyard 5 stocking this automobile, the host computer 2 adds one to a car number in a pertinent column of the stockyard information database 21d, and updates the car number (S12). In contrast to this, when there is no stockyard 5 stocking the automobile of the specified car kind and grade, the host computer 2 determines the stockyard 5 in consideration of a vacant area of each stockyard 5, - - - , etc., and newly sets the car kind and the grade to the stockyard information database 21d, and sets one to the car number (S12). Namely, the automobile of the same car kind and the same grade is classified, and is temporarily stocked to each stockyard 5, - - - .

Further, the host computer 2 judges whether the updated car number reaches a lot car number or not (S13). When the updated car number reaches the lot car number, the host computer 2 determines this lot car number of automobiles (disused cars) of the same car kind and the same grade as a lot, and gives a lot number, and determines a dismantling factory 6 (S15).

On the other hand, when the updated car number is smaller than the lot car number, the host computer 2 calculates a past collecting pace (a collected car number per one day) of the automobiles of the specified car kind and grade on the basis of the past collecting information database 21c, and estimates the number of automobiles able to be collected in a few days. The host computer 2 then judges whether or not the car number is expected to reach the lot car number during the dismantlement (S14). When there is no expectation, the host computer 2 waits for a signal of trading-in information or collecting information.

In contrast to this, when there is such expectation, the host computer 2 determines the number of automobiles (disused cars) of the same car kind and the same grade smaller than this lot car number as a lot, and gives a lot number, and determines a dismantling factory 6 (S15).

After the host computer 2 gives the lot number, the host computer 2 sets the lot number, etc. to the disused car information database 21b, the stockyard information database 21d and the dismantling factory information database 21e, and transmits stock information to a pertinent stockyard 5 and also transmits dismantling information to a pertinent dismantling factory 6 (S16). Then, automobiles are supplied to the dismantling factory 6 every lot on the basis of the stock information in the stockyard 5, and are dismantled every lot on the basis of the dismantling information in the dismantling factory 6.

Figure 12:
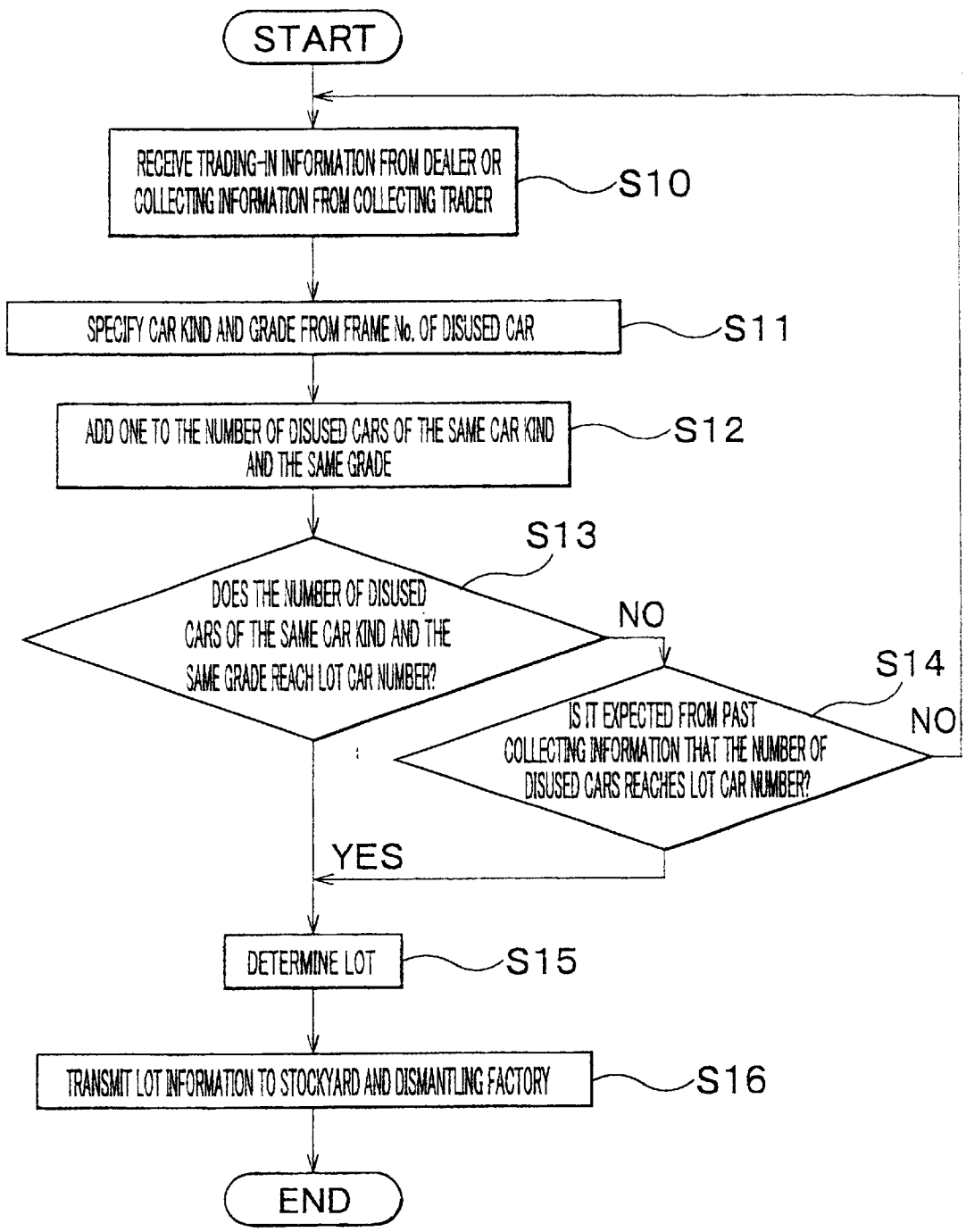
FIG. 12 is a flow chart of a lot determining method in this embodiment mode.

In this embodiment mode, processings from S11 to S15 in the flow chart of FIG. 12 correspond to a lot determining process described in the claims. In particular, in this embodiment mode, the processing of S14 in the flow chart of FIG. 12 corresponds to the lot determining process described in claim 10.

The insufficient recycle material managing method will next be explained along the flow chart of FIG. 13. When there is an insufficient recycle material or a recycle material estimated to be insufficient on the basis of a product plan of regenerative parts, recycle material insufficient information is transmitted from the regenerative parts factory 7 to the host computer 2. Then, the host computer 2 receives this recycle material insufficient information, and specifies the insufficient recycle material (S20).

After the reception, on the basis of the recycle material information database 21f, the host computer 2 judges whether or not the insufficient recycle material exists in the dismantling factories 6, - - - , or whether or not an automobile having the insufficient recycle material as constructional parts is stocked to the stockyards 5, - - - (S21). When the insufficient recycle material exists (or the automobile is stocked), the host computer 2 transmits information with respect to the insufficient recycle material set to the recycle material information database 21f to the regenerative parts factory 7 as recycle material supply information (S24). Thus, the regenerative parts factory 7 preengages the insufficient recycle material to the host computer 2, etc. on the basis of the recycle material supply information. The host computer 2 preferentially determines the lot of the automobile of these car kind and grade, a dismantling order, etc. to supply the insufficient recycle material to the regenerative parts factory 7 as soon as possible such that the automobile of the car kind and the grade having the insufficient recycle material is early dismantled.

On the other hand, when there is no insufficient recycle material (or no automobile is stocked), the host computer 2 specifies the car kind and the grade of the automobile having the insufficient recycle material as constructional parts on the basis of the automobile constructional parts information database 21a(S22).

The host computer 2 transmits information of the specified car kind and grade to the dealers 3a, 3b, - - - and the collecting traders 4a, 4b, - - - as insufficient car kind information (S23) Further, the host computer 2 transmits information of nonexistence of the insufficient recycle material at present in the dismantling factories 6, - - - and the stockyards 5, - - - to the regenerative parts factory 7 as recycle material supply information (S24).

In the dealers 3a, 3b, - - - and the collecting traders 4a, 4b, - - - , trading-in and collecting prices are set to be higher than normal trading-in and collecting prices to early collect the automobile of the car kind and the grade set to insufficient car kind information. Therefore, when no recycle material insufficient in the regenerative parts factories 7, - - - exists within the automobile dismantling system 1, this insufficient recycle material can be rapidly collected in the automobile dismantling system 1.

Figure 13:
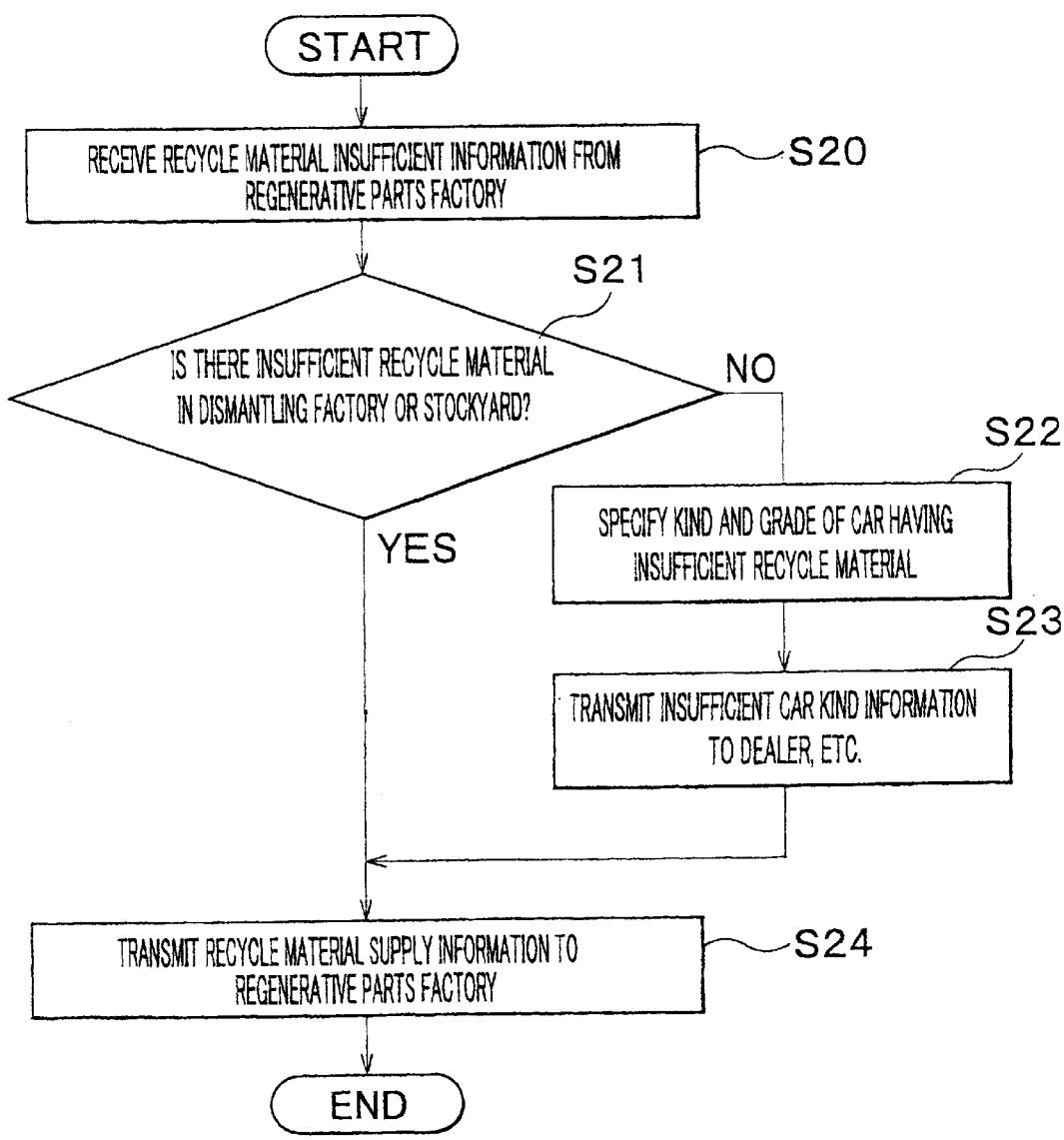
FIG. 13 is a flow chart of an insufficient recycle material managing method in this embodiment mode.

In this embodiment mode, processings from S21 to S23 in the flow chart of FIG. 13 correspond to an insufficient recycle parts managing process described in the claims.

An insufficient used parts managing method will next be explained along the flow chart of FIG. 14. When there are insufficient used parts or used parts estimated to be insufficient, the automobile repairing factory 8 or the used parts sales trader 9 transmits used parts insufficient information to the host computer 2. The host computer 2 receives this used parts insufficient information, and specifies the insufficient used parts (S30).

After the reception, on the basis of the used parts information database 21g, the host computer 2 judges whether or not the insufficient used parts exist in the dismantling factories 6, - - - , or whether or not an automobile having the insufficient used parts as constructional parts is stocked to the stockyards 5, - - - (S31). When the insufficient used parts exists (or the automobile is stocked), the host computer 2 transmits information with respect to the insufficient used parts set to the used parts information database 21g to the automobile repairing factory 8 or the used parts sales trader 9 as used parts supply information (S34).

The automobile repairing factory 8 or the used parts sales trader 9 then preengages the insufficient used parts to the host computer 2, etc. on the basis of the used parts supply information. The host computer 2 preferentially determines a lot of the automobile of the car kind and the grade having the insufficient used parts, a dismantling order, etc. so as to early dismantle this automobile such that the insufficient used parts are supplied to the automobile repairing factory 8 or the used parts sales trader 9 as soon as possible.

On the other hand, when no insufficient used parts exist (or no automobile is stocked), the host computer 2 specifies the car kind and the grade of the automobile having the insufficient used parts as constructional parts on the basis of the automobile constructional parts information database 21a (S32)

Then, the host computer 2 transmits information of the specified car kind and grade to the dealers 3a, 3b, - - - and the collecting traders 4a, 4b, - - - as insufficient car kind information (S33). Further, the host computer 2 transmits information of nonexistence of the insufficient used parts at present in the dismantling factories 6, - - - and the stockyards 5, - - - to the automobile repairing factory 8 or the used parts sales trader 9 as used parts supply information (S34).

In the dealers 3a, 3b, - - - and the collecting traders 4a, 4b, - - - , trading-in and collecting prices are set to be higher than normal trading-in and collecting prices to early collect the automobile of the car kind and the grade set to the insufficient car kind information. Therefore, when no used parts insufficient in the automobile repairing factory 8 or the used parts sales trader 9 exist within the automobile dismantling system 1, these insufficient used parts can be rapidly collected to the automobile dismantling system 1.

Figure 14:
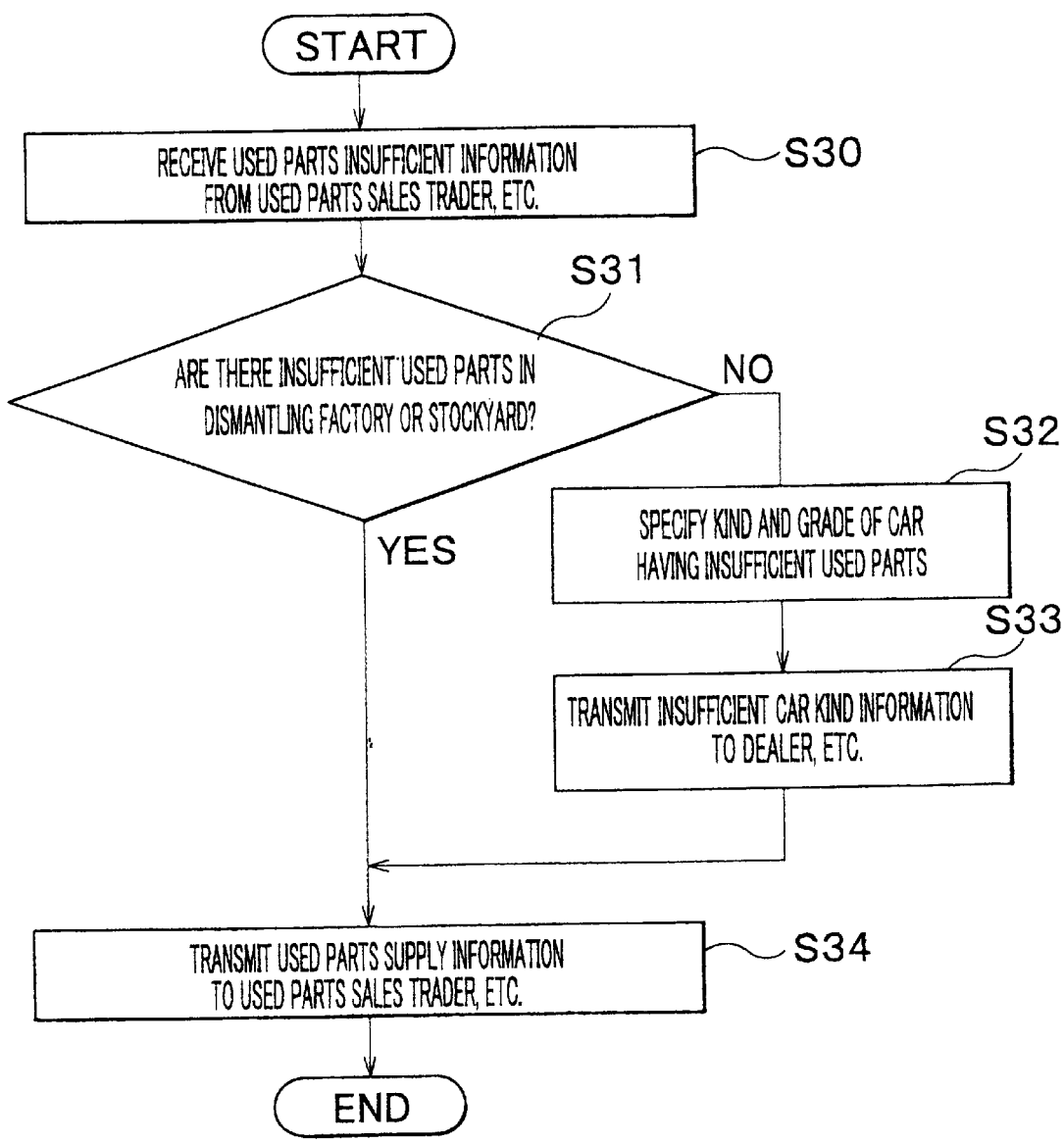
FIG. 14 is a flow chart of an insufficient used parts managing method in this embodiment mode.

In this embodiment mode, processings from S31 to S33 in the flow chart of FIG. 14 correspond to an insufficient recycle parts managing process described in the claims.

In accordance with this automobile dismantling method, a lot number of automobiles of the same car kind and the same grade are set to a lot in a dismantling unit, and dismantling work efficiency is improved. Further, in the automobile dismantling method, dismantlement can be started when the number of automobiles is smaller than the lot car number, but there is a prospect of reaching the lot car number in a few days. Accordingly, a time until the reaching of the lot car number is shortened. Further, in the automobile dismantling method, when there is no insufficient recycle material or used parts, the insufficient recycle material or used parts can be rapidly collected so that the required recycle material and used parts can be early supplied.

As mentioned above, the present invention is not limited to the above embodiment modes, but can be embodied in various modes.

For example, the dismantling system of a product and its method in the present invention are applied to the automobile dismantling system and its method. However, the present invention can be also applied to a dismantling system of a home electric product, a motor-bicycle, an airplane, etc. and its method.

Information with respect to an automobile (product) to be dismantled and/or information with respect to an insufficient recycle material and used parts can be transmitted from an end user unconnected by WAN, other traders, etc. to the host computer through the Internet, electronic mail, etc.

Further, a frame number (identification information) is inputted from a terminal (input means), but product kind information such as a car kind, a grade, etc. may be inputted from the input means.

Industrial Applicability (1) In accordance with the dismantling system of a product in the present invention, a predetermined number of products of the same kind or the approximately same kind are collected as a lot in a dismantling unit. Accordingly, all constructional parts of a dismantled product are set to be the same or almost the same, and can be continuously dismantled in the same or almost same dismantling work procedure. Therefore, the number of works of a worker is reduced, and it is not necessary to change the construction of a dismantling means so that dismantling work efficiency is improved.

(2) Since the product kind can be specified from identification information of the product on the basis of a product information database, the products of plural kinds can be simply classified into products of the same kind or the approximately same kind.

(3) The respective constructional parts can be classified into recycle material parts, used parts, disused parts, etc. in detail on the basis of the product information database so that the dismantled parts can be effectively used practically.

(4) Since the kind of the product having insufficient recycle material and used parts is specified and the product of this kind is preferentially collected, the required recycle material and used parts can be rapidly supplied. Therefore, operating efficiency of the entire dismantling system is improved, and a stocking space of the recycle material, the used parts, etc. can be reduced.

(5) When the number of products of the same kind or the approximately same kind is smaller than a predetermined number, but there is a prospect of reaching the predetermined number, dismantlement can be started with this product number as a lot. Therefore, the operating efficiency of the entire dismantling system is further improved, and the stocking space of a collected product can be reduced.

(6) Further, in the dismantling method of a product in the present invention, a predetermined number of products of the same kind or the approximately same kind are collected as a lot in a dismantling unit. Accordingly, all constructional parts of a dismantled product are set to be the same or almost the same, and can be continuously dismantled in the same or almost same dismantling work procedure. Therefore, the number of works of a worker is reduced so that dismantling work efficiency is improved.

(7) Since the product kind can be specified from identification information of the product on the basis of a product information database, the products of plural kinds can be simply classified into products of the same kind or the approximately same kind.

(8) The respective constructional parts can be classified into recycle material parts, used parts, disused parts, etc. in detail on the basis of the product information database so that the dismantled parts can be effectively used practically.

(9) Since the kind of the product having insufficient recycle material and used parts is specified and the product of this kind is preferentially collected, the required recycle material and used parts can be rapidly supplied. Therefore, it is possible to shorten a time from the collection of the product to the supply of the dismantled parts, and a stocking space of the recycle material, the used parts, etc. can be reduced.

(10) When the number of products of the same kind or the approximately same kind is smaller than a predetermined number, but there is a prospect of reaching the predetermined number, dismantlement can be started with this product number as a lot. Therefore, a time from the collection of the product to the dismantlement can be shortened, and the stocking space of a collected product can be reduced.

What is claimed is:

1. A dismantling system for a product of plural kinds comprising:

input means for inputting information of a kind of the product to be dismantled;

memory means for storing the information inputted from said input means;

lot determining means for classifying said product into the same kind or the approximately same kind on the basis of the stored product information, and determining a lot when the number of the product of the same kind or the approximately same kind reaches a predetermined number;

dismantling means for dismantling said product;

wherein said product is dismantled by said dismantling means every said lot; and a product information database for setting kind information of said product corresponding to identification information of said product.

2. A dismantling system according to claim 1, wherein said input means inputs the identification information of said product; and said lot determining means classifies said product into the same kind or the approximately same kind on the basis of said product information database.

3. A dismantling system according to claim 2, wherein recycle information of each constructional part of said product is set in accordance with the identification information and/or the kind information of said product in said product information database; and each constructional part dismantled by said dismantling means from said product is classified on the basis of said recycle information.

4. A dismantling system according to claim 3, wherein the dismantling system further comprises:

collecting means for collecting said product;

dismantled parts treating means for treating each constructional part dismantled from said product as a recycle material and/or used parts; and insufficient recycle parts managing means for specifying the kind of the product having insufficient recycle material and/or used parts as constructional parts on the basis of said product information database, and instructing the collection of the product of said specified kind when the recycle material and/or the used parts are insufficient in said dismantled parts treating means;

wherein the product of the kind instructed by said insufficient recycle parts managing means is preferentially collected by said collecting means.

5. A dismantling system according to any one of claims 1 to 4, wherein the dismantling system further comprises a past collecting information database for setting a past collecting situation of said product in accordance with a product kind; and said lot determining means determines a lot before the number of the product of the same kind or the approximately same kind reaches said predetermined number, when it is expected that the number is likely to reach said predetermined number on the basis of said past collecting information database.

6. A dismantling method for a product of plural kinds comprising:

a lot determining process for classifying said product into the same kind or the approximately same kind on the basis of information of a kind of the product to be dismantled, and determining a lot when the number of products of the same kind or the approximately same kind reaches a predetermined number;

wherein said product is dismantled every said lot; and setting kind information of said product corresponding to identification information of said product in a product information database.

7. A dismantling method according to claim 6, wherein said product is classified into the same kind or the approximately same kind on the basis of said product information database in said lot determining process.

8. A dismantling method according to claim 7, wherein recycle information of each constructional part of said product is set in accordance with the identification information and/or the kind information of said product in said product information database, and each constructional part dismantled from said product is classified on the basis of said recycle information.

9. A dismantling method according to claim 8, wherein the dismantling method further includes an insufficient recycle parts managing process for specifying a kind of the product having insufficient recycle material and/or used parts as constructional parts on the basis of said product information database, and instructing collection of the product of said specified kind, when the recycle material and/or the used parts are insufficient, and the product of the kind instructed in said insufficient recycle parts managing process is preferentially collected.

10. A dismantling method according to any one of claims 6 to 9, wherein a past collecting information database is arranged for setting a past collecting situation of said product in accordance with said product kind; and a lot is determined in said lot determining process before the number of the product of the same kind or the approximately same kind reaches said predetermined number, when it is expected that the number is likely to reach said predetermined number on the basis of said past collecting information database.

11. A dismantling system for a product of plural kinds comprising:

input means for inputting information of a kind of the product to be dismantled;

memory means for storing the information inputted from said input means;

lot determining means for classifying said product into the same kind or the approximately same kind on the basis of the stored product information, and determining a lot when the number of the product of the same kind or the approximately same kind reaches a predetermined number; and dismantling means for dismantling said product, wherein said product is dismantled by said dismantling means every said lot, wherein the dismantling system further comprises a past collecting information database for setting a past collecting situation of said product in accordance with a product kind; and said lot determining means determines a lot before the number of the product of the same kind or the approximately same kind reaches said predetermined number, when it is expected that the number is likely to reach said predetermined number on the basis of said past collecting information database.

12. A dismantling method for a product of plural kinds comprising:

a lot determining process for classifying said product into the same kind or the approximately same kind on the basis of information of a kind of the product to be dismantled, and determining a lot when the number of products of the same kind or the approximately same kind reaches a predetermined number;

wherein said product is dismantled every said lot, wherein a past collecting information database is arranged for setting a past collecting situation of said product in accordance with said product kind; and a lot is determined in said lot determining process before the number of the product of the same kind or the approximately same kind reaches said predetermined number, when it is expected that the number is likely to reach said predetermined number on the basis of said past collecting information database.

* * * * *